US008676800B2

(12) United States Patent
Peters et al.

(10) Patent No.: US 8,676,800 B2
(45) Date of Patent: Mar. 18, 2014

(54) METHOD AND SYSTEM FOR GENERATING TEXT

(75) Inventors: Lindsay Peters, Eastwood (AU); Timothy Lavers, Woonona (AU)

(73) Assignee: Pacific Knowledge Systems Pty Ltd, Surry Hills (AU)

(*) Notice: Subject to any disclaimer, the term of this patent is extended or adjusted under 35 U.S.C. 154(b) by 266 days.

(21) Appl. No.: 12/981,840

(22) Filed: Dec. 30, 2010

(65) Prior Publication Data

US 2011/0125740 A1     May 26, 2011

Related U.S. Application Data

(63) Continuation-in-part of application No. PCT/AU2009/000134, filed on Feb. 6, 2009.

(30) Foreign Application Priority Data

Jul. 2, 2008 (AU) .................................. 2008903403
Oct. 12, 2010 (AU) .................................. 2010904545

(51) Int. Cl.
*G06F 17/30*     (2006.01)

(52) U.S. Cl.
USPC .................................... 707/736; 707/E17.044

(58) Field of Classification Search
None
See application file for complete search history.

(56) References Cited

U.S. PATENT DOCUMENTS

| | | | |
|---|---|---|---|
| 6,004,276 | A | 12/1999 | Wright et al. |
| 6,553,361 | B1 * | 4/2003 | Compton et al. ............... 706/47 |
| 6,735,593 | B1 | 5/2004 | Williams |
| 2002/0188896 | A1 * | 12/2002 | Filteau et al. .................. 714/57 |
| 2005/0039119 | A1 | 2/2005 | Parks et al. |
| 2006/0259509 | A1 | 11/2006 | Stolte et al. |
| 2008/0040162 | A1 | 2/2008 | Brice |
| 2008/0270479 | A1 | 10/2008 | Soderstrom et al. |

FOREIGN PATENT DOCUMENTS

WO     2009099379 A1     8/2009

OTHER PUBLICATIONS

International Search Report for PCT/AU2009/000134, mailed May 8, 2009.
Australian Patent Examination Report dated Jul. 6, 2012.
Australian Patent Examination Report dated Nov. 23, 2012.
Prat, et al.: "Representation of Aggregation Knowledge in OLAP Systems"; Association for Information Systems; AIS Electronic Library (AISeL); Jan. 1, 2010.
Koutsoukis, et al: "Adapting on-line analytical processing for decision modelling: the interaction of information and decision technologies"; Decision Support Systems; copyright 1999; Elsevier Science B.V.
Walid Q. Qwaider: "Medicine Decision Support System Using OLAP with Data Warehousing"; University of Jordan, Apr. 2009.

* cited by examiner

*Primary Examiner* — Anteneh Girma
(74) *Attorney, Agent, or Firm* — McClure, Qualey & Rodack, LLP

(57) ABSTRACT

The present invention generally relates to a method and system for generating text, and particularly but not exclusively to a method and system for generating syntactically correct text for a report. The ability of an expert system to interpret data is limited by the same factor that limits a human expert—data complexity. Therefore, traditional expert systems suffer limitations in interpreting ever increasing volumes of complex data and in converting such data to knowledge. The present invention provides a means for interpreting complex data and in converting such data to knowledge expressed in a textual report.

38 Claims, 13 Drawing Sheets

METHOD AND SYSTEM FOR GENERATING TEXT

CROSS REFERENCE RELATED APPLICATIONS

This application is a bypass continuation-in-part application of and claims priority from PCT/AU2009/000134 filed on Feb. 6, 2009, which claims priority to AU Application No. 2008903403, filed on Jul. 2, 2008, this continuation-in-part applications also claims priority to AU 2010904545 filed on Oct. 12, 2010, which are incorporated herein by reference in their entirety.

FIELD OF THE INVENTION

The present invention generally relates to a method and system for generating text, and particularly but not exclusively to a method and system for generating syntactically correct text for a report.

BACKGROUND OF THE INVENTION

Exponential increases in computer power, including processing speed and memory capacity, since the mid twentieth century have dramatically increased the usefulness of computing in every sector of society and indeed in our daily lives. One of the main uses of computers is the generation and storage of ever increasing volumes of data. However, by itself, raw data has only limited value. In most instances, its true value can only be obtained once it has been interpreted by someone with the requisite understandings and insights. This interpretation process is a value-adding process converting "data" to "knowledge" and then often to "judgements". This knowledge or judgement is often expressed in a textual report.

While computer-driven processes are useful to extract, collate and store both numeric and textual data, the ability to effectively interpret this data, either by a human or a computer, may be limited by the large data volumes and associated complexity.

For a human, the ability to make a judgement so as to correctly interpret a body of data in a timely fashion will require that the data be pre-processed and reduced sufficiently so that the significant features are evident.

For a rules based expert system, there is a further but related requirement that each rule be as general as possible in order to avoid a proliferation of rules needed to take into account all the specificities of large and complex data sets. More general rules are built using higher-level abstractions from the data set, so that variations in the specifics of the underlying data do not necessarily invalidate those rules. These higher-level abstractions are precisely the significant features that a human expert building the rules based expert system will use.

That is, just like a human expert, an expert system needs complex data to be reduced to a form where the inferencing can be based on a smaller set of significant features, rather than the large set of original data values.

The task is therefore to find ways to reduce the data complexity of the data to be interpreted by pre-processing the data into a smaller, less complex set of significant values which can then be presented to the human or computer for subsequent interpretation.

There are two key factors contributing to data complexity. The first is the sheer number of data item values that may need to be interpreted—that is, when there are a large number of elements in a given system that need to be analysed.

For example, in order to generate a patient test report for a referring physician, the laboratory pathologist may have to interpret the results of hundreds of protein biomarkers used in the diagnostic instrument that has analysed the patient's blood sample.

The second factor driving complexity is the size and possibly unstructured ('freeform') format of individual data values themselves. A single numeric or enumerated value (i.e. a text code), by itself, may be relatively simple to interpret as there is a clear association of this 'atomic' value with its corresponding data item, e.g. a troponin value of 3.4 mmol/L.

However, a large freeform piece of text may contain ambiguities, misspellings, abbreviations, more than one data value, or one of many different possible representations of the same data value, making it much harder to interpret.

For example, in order to generate a patient test report for a referring physician, the laboratory pathologist may have to interpret the machine generated test results in the context of a lengthy textual clinical history of the patient provided by the referring physician. The clinical history is complex because it is a large and unstructured data item and relatively minor variations in the text can completely change the resulting interpretation. For example, the shorthand phrases "DM" (known diabetes mellitus), "FH DM" (family history of diabetes mellitus), "? DM" (query diabetes mellitus) "not DM" (not diabetic) will all change the pathologist's interpretation of a given set of glucose test results. Note also that synonyms ("DM", "Diabetic", "Diab", "Diabetes noted"), misspellings ("Diabetes Mellitis") and variations in word ordering ("? DM", "DM ?") in the clinical notes all need to be understood by the pathologist when they make their interpretations.

A clinical history may also contain the phrase "on Zocor" or "on lipid lower treatment", both phrases representing a second concept which indicates to the pathologist whether the patient is on some heart medication. This sort of phrase will likewise affect the pathologist's interpretation of the test results and the resulting report to the referring physician.

Taking a specific example "DM, on Zocor", there is no clear association between the 'clinical history' data item and an atomic value. Rather, the clinical history as a complex data item implicitly contains two simpler, atomic data items, e.g. Diabetic (yes) and On Treatment (yes).

Another example of this second type of complexity due to the size and lack of structure of a data item value is where the primary laboratory performs some of the patient tests 'in house', but sends away the blood sample to a second laboratory for some more specialised tests. The second laboratory will return their findings in a textual report. From the perspective of the pathologist at the primary laboratory, the report received from the second laboratory is a complex data item. The pathologist will have to interpret both this report plus the results done at the primary laboratory in order to make the final report to the referring physician.

Another example of a clinical domain with complex data is the allergy domain, in which potential allergens needs to be tested in a blood sample, then matched against symptoms in a potentially lengthy and free-form patient history in order to identify the relevant allergen(s). Infectious diseases (identification of a pathogen), multisystem illnesses (e.g. identification of an underlying cause in neurology, endocrinology, oncology) are other examples.

Similar difficulties in the interpretation of complex data arise in the non-medical fields such as fraud detection (e.g. in re-issuing airline tickets, driver's licences and passports, credit card purchases, and electronic commercial transactions), auditing in logistics, inventory management, serial numbering (e.g. in detection of counterfeiting, or for product recall purposes), or IT support services.

In the example of airline fraud detection, a large number of events containing unstructured or semi-structured data on ticket sales and passenger flights need to be recorded then matched against pricing faresheets and other criteria for airline ticket re-issue to identify whether the correct pricing has been applied for a specified airline ticket.

This is a laborious task since information contained in faresheets and airline tickets is either unstructured or only semi-structured, and each set much be individually interpreted by human experts to determine if the conditions expressed in the faresheet have, in fact, been followed.

To enable efficient and accurate interpretation by a human expert, complex data on a faresheet needs to be reduced to a set of conditions that are applicable to the specific ticket (in this example). The relevant characteristics of that ticket (start and destination cities, date of travel, class of travel, price) also need to be extracted. Once the data on the faresheet and ticket has been pre-processed into these significant features, a human expert can make the judgement as to whether there has been a fraudulent or incorrect ticketing event.

The task of real estate valuation is another area where interpretation of complex data is required. In this domain, the interpretation required is a valuation comprising of a dollar amount with a supporting narrative. The data on which the interpretation is made consists of a variety of complex and disparate data including house and land size, house orientation, postcode and recent valuations of nearby or other comparable properties. Freeform textual notes describing various characteristics of the property (e.g. a view blocked by an adjacent high-rise apartment block), may contain important factors impacting the valuation, and so need interpretation.

Another example of a non-clinical domain requiring the interpretation of complex data is the field of IT support services. Consider an online-transaction processing system where a company provides regular value-added outputs to its subscribing customers such as news feeds or other reports.

The reliability of the company's online-transaction processing system is critical to the performance of this service. To achieve a very high level of reliability, the system must be continuously monitored for all factors that could impact on its reliability.

These factors include transaction rates, user activity, resource usage such as memory, disk, and CPU, as well as operating system generated alerts and warnings, and alerts and warnings generated by the transaction-processing application itself. A standard way of recording these factors is to continuously log all this information to a central facility, e.g. a log file, where it can be analysed by the company's IT support staff on a regular basis. The goal is for IT support staff to act upon any serious alerts or concerning trends recorded in the log file before the online transaction system fails.

As the log entries are generated by various operating system or application system components, often from different vendor products, they are not formatted according to a universal coding system but are essentially free text. For a large online-transaction processing system, the log file can be very large, e.g. tens of Mbytes per day, which is beyond the scope of IT support staff to examine manually. Furthermore, certain classes of alerts may require immediate action, in which case the determination of the alert and the corresponding remedial action may need to be identified promptly.

As in the previous examples, to enable efficient and accurate interpretation by a human expert, complex data in a log file needs to be pre-processed into a set of significant features such as alert or trend status conditions from which a human expert can make the judgement as to whether any remedial action needs to be taken.

A computer-based expert system attempts to mimic the human interpretive process. For example, RippleDown is a computer-based expert system (decision engine) that is taught by a domain expert how to make highly specific interpretations on a case-by-case basis, as described in U.S. Pat. No. 6,553,361.

Similarly to a human expert, a rules-based expert system needs to have the data presented to it in terms of the relevant significant features so that it can inference from these features. If it were to inference from the complex raw data (e.g. data in the fare sheets and tickets themselves), the number of specific rules required would not only be unmanageable, but once built it would fail to interpret any newly encountered variations in the fare sheets or tickets.

In a high transaction environment, expert systems can perform an essential role in leveraging human expertise to provide rapid interpretations of raw data. For example, a pathology laboratory may need to provide interpretive reports for tens of thousands of patients per day, far beyond the manual capability of the few pathologists who might be employed at that laboratory.

However, the ability of an expert system to interpret data is limited by the same factor that limits a human expert—data complexity. Complex data needs to be pre-processed into a form so that rules can be built using the higher-level concepts that a human expert would use, and to avoid the proliferation of rules and report definitions that would otherwise result.

Two more detailed and specific examples of the data complexity problem are now given.

The first more specific example is in the field of medical pathology where complicated investigations commonly performed by professionals, such as medical pathologists, often require a large number of tests. The interpretation of the test results is often difficult and requires the skill of an expert or expert system. The expert or expert system will generate text for inclusion in a report containing a useful analysis and interpretation of the test results, sometimes in a highly condensed form, to be forwarded to the referring doctor (e.g. the family physician) who may not have the expertise to interpret the raw test results themselves. To date, the knowledge bases of expert systems have been built in domains in which tests are relatively independent of each other. For example, a knowledge base for thyroid reporting principally considers results of thyroid function testing (namely, TSH, FT3 and FT4). Other patient demographic data such as age and sex also generally needs to be taken into account, as well as the observations recorded in clinical notes from a physical examination or from an oral history. Reports generated using these knowledge bases refer to these individual tests and their values, as well as providing a diagnosis and often a recommendation for treatment and follow-up testing. Typically in these domains, there are less than 20 tests to consider, plus patient demographic data like age and sex, plus observations in clinical notes provided by the medical practitioner. While test results may interact and so be related to some extent (e.g. if one test is abnormal, another is also likely to be abnormal), the low number of tests and test interactions to be considered means that the rules in the knowledge base can refer to the individual test results themselves and still maintain its generality. That is, the test results do not have to be reduced by some pre-processing step to a smaller set of significant features before interpretation.

Specific rules comprising of a textual comment given under certain conditions can be written by considering each individual test result, or by considering the relatively few significant combinations of test results. For example, for a thyroid panel of tests, the comment may be generated "Consistent with primary hypothyroidism" if the TSH test result is elevated.

Traditional clinical domains such as the thyroid example above have just a few Attributes. However, for newer clinical domains with potentially hundreds or even thousands of possible investigations, the application of specific rules to each type of investigation becomes infeasible. For example, the medical practitioner may request a number of food allergy tests such as peanut, soya, milk, wheat and egg. If soya and milk return very high positive values (e.g. 24.3 and 30.1 respectively) and the other tests are negative, the pathologist will want the report sent back to the doctor to include a comment like:

"Very high results were detected for milk (30.1) and soya (24.3)"

The rule that allows the interpretation of the test data to give this comment is along the lines of:

10<=milk<=50, indicating a very high result, and
10<=soya<=50, indicating another very high result, and
milk>soya, indicating that the milk value should be before the soya in the report, and peanut=0, and
wheat=0, and egg=0

In this simple example with just 5 allergens tested, the number of combinations of the above comment is $2^5=32$ (neglecting order of importance). Corresponding to each combination of test results there needs to be a different rule.

It is clearly not practical to separately define each of the 32 possible combinations of this comment and corresponding rules even for this simple comment—and real-world examples are far more complex than this.

In the case of an allergy knowledge base there are literally hundreds of possible tests that can be performed in an investigation, each measuring the same chemical (IgE), with the value of each test indicating the patient's response to a particular allergen. In cases where there are hundreds of tests in an investigation it would be impossible for an expert to define all the possible interactions between the test results and provide the multitude of comment variations that an accurate report would require. Before an interpretive knowledge base could be defined, the data complexity of this domain would have to be substantially reduced.

However, the computational challenge of generating a report that takes into account highly complex data is beyond the capability of traditional expert systems. For example, if there were four hundred tests and each test had only a binary output, such as "positive" or "negative", then there would be $2^{400}$ possible combinations of test results, each combination requiring a unique reporting text conclusion that had been previously generated and stored on a computer system. This does not even account for possible interactions between the test data or other relevant inputs such as clinical notes which greatly complicates the situation. The traditional approach of attempting to interpret complex data is not feasible when there are hundreds or more observations. In the clinical setting, the variety of cases and their corresponding reports even with a modest number of tests can be huge, and even more so when the patient's historical information and clinical notes are also taken into account.

The second more specific example is an airline ticketing application where tickets may be issued directly by the airline, or indirectly through travel agents, airline consolidators or online travel websites. If a ticket needs to be re-issued (e.g. due to a change in the itinerary, or to replace a lost or destroyed ticket), the details of the original transaction need to be verified against faresheets (a document of terms and conditions governing airline tickets) and against the original transaction details (e.g. amount paid, number of tickets purchased, currency of transaction, names of passenger(s), date and location of purchase). A particular difficulty is that airline faresheets are complex textual data items. They do not follow any definite format but nevertheless contain certain important information—often expressed as a number of Key Terms, such as "cancellation", "before travel", "lost ticket", and so on, plus monetary values and dates. Within a single faresheet, and between faresheets, each Key Term can appear in a variety of forms. For example, "free of charge", "foc", and "no penalty" all mean the same thing.

As well as containing Key Terms, each of the faresheets specifies certain information, such as the penalty for cancellation before travel, the penalty for a lost ticket, and so on. Each of these Key Concepts is expressed in a variety different ways using the Key Terms.

Therefore, it is necessary in the above example to analyse blocks of free text containing relevant information expressed in a variety of ways, then to analyse information from the free text along with other data to reach a conclusion. An analogous problem arises in the context of medical diagnosis, where clinical notes may contain important information expressed in free text and must be interpreted in conjunction with pathology tests and demographic data.

The difficulties in interpreting blocks of free text include:
(a) the difficulty in extracting one or more significant features from a block of free text so that rules can be built using these significant features;
(b) the difficulty for a knowledge base to deal with minor variants of the block of free text. if the textual data in a block of free text is not quite the same as the text on which the rules were built, those rules may not be sufficiently general to still apply to the new free text block;
(c) the difficulty for a knowledge base to deal with different representations of the significant features themselves, both within the one free text block or between free text blocks; and
(d) the need to build rules based on a block of free text containing multiple Key Terms and encapsulating possibly several higher-level Key Concepts. A 'Key Concept' is a significant feature embedded in the free text that will be used by the expert or expert system when making an interpretation. A Key Concept is a unique higher-level code referring to a sequence of Key Terms. Several variants of Key Term sequences may map to a single Key Concept;

In summary, traditional computer-enabled expert systems that are used to mimic the human interpretive process in interpreting data suffer a number of limitations when used to interpret complex data, including:
(a) difficulty in interpreting very large volumes of data values, since the rules that drive the interpretive process become overly complex and unwieldy when very large numbers of data values need to be taken into account in order to reach a conclusion or express a judgement (e.g. a definitive diagnosis); and
(b) difficulty in dealing with large and unstructured data item values, resulting in the inability to interpret such complex data. Reducing complex data items to a canonical form where simpler, atomic data items and values can be extracted and used in rules and conclusions is an unwieldy process and poses long term difficulties in maintaining a knowledge base.

Therefore, traditional expert systems suffer limitations in interpreting ever increasing volumes of complex data and in converting such data to knowledge or a judgement (the knowledge or judgement being expressed in a textual report). There is a need for a computer-enabled method and system for generating text (such as a textual report) that is capable of interpreting large volumes of complex data, including numeric and textual data obtained from disparate sources and presented in various forms, including as freeform text, or alternatively, structured text as in a 'synoptic' report.

It is an object of the present invention to provide a method and system for overcoming the described limitations of traditional expert systems in interpreting complex data and in converting such data to knowledge or a judgement expressed in a textual report.

SUMMARY OF INVENTION

According to a first aspect of the invention there is provided a method of generating information from a plurality of data items, the method comprising the steps of:
  (a) populating an aggregate data item with at least one of the plurality of data items; and
  (b) generating the information using the aggregate data item,
    wherein the aggregate data item is a form of derived attribute,
    wherein a derived attribute is a data item constructed from the data items using a formula such that one or more high level concepts is extracted from the data items thereby allowing a condensed volume of more relevant data to be considered in generating the information, and
    wherein the method of generating information is performed by a decision support system,
    and wherein the information so generated falls into one or more of the following groups:
      i. textual information;
      ii. a machine instruction.

According to a second aspect of the invention there is provided a system for generating information from a plurality of data items, the system comprising:
  (a) a preprocessor for
    i. populating an aggregate data item with at least one of the plurality of data items; and
    ii. for constructing one or more other derived attributes from the plurality of data items; and
  (b) an information generator for generating the information using the derived attributes using the aggregate data item and other derived attributes,
  wherein the information generator forms at least part of a decision support system,
  wherein the aggregate data item is a form of derived attribute,
  wherein a derived attribute is a data item constructed from the data items using a formula such that one or more high level concepts is extracted from the data items thereby allowing a condensed volume of more relevant data to be considered in generating the information, and
  wherein the information so generated falls into one or more of the following groups:
    i. textual information;
    ii. a machine instruction In an embodiment, the method comprises the prestep of populating each of a plurality of elements of a predefined structure with a corresponding one of the data values, the structure relating each of the plurality of elements to the aggregate data item. The method may comprise populating the aggregate data item with at least one of the plurality of data items in accordance with the structure.

In an embodiment, the method comprises working through the structure to determine one or more characteristics of the aggregate data item.

In an embodiment, the structure relates a plurality of aggregate data items, and the method comprises working through the structure to determine one or more characteristics of each of the aggregate data items.

In an embodiment, the information comprises textual information. The information may be clinical decision support information. Alternatively, the information comprises a machine instruction.

In an embodiment, the step of generating the information comprises the step of generating information using a knowledge base or Decision Support System.

In an embodiment, the step of populating the aggregate data item comprises a step of receiving the plurality of data items. In an embodiment, the textual information may be syntactically and/or grammatically correct. The textual information may be human readable. In an embodiment, the textual information may form at least part of a report. The report may be associated with one or more test results. In an embodiment, each data item may correspond to one of the test results. The test may comprise anyone of an allergy test, a leukaemia test, a pathology test, a blood test, and any other type of medical test. A data item may correspond to any other information such as gender, age, demographic information or clinical symptoms.

In an embodiment, the aggregate data item comprises data items which are related. In an embodiment, the step of populating the aggregate data item comprises the step of populating the aggregate data item by applying a rule to at least one of the plurality of data items, or another aggregate data item. The rule may be a domain specific rule. The rule may alternatively be a case specific rule. The rule may be to populate the aggregate data item with one or more of the data items. The rule may be to populate the aggregate data item with one or more of the data items that are above a threshold value. The rule may be to populate the aggregate data item with one or more of the data items that are below a threshold value.

In an embodiment, the method comprises: (a) populating one or more aggregate data items with at least one of the plurality of data items (b) populating one or more further aggregate data items with data items from the one or more aggregate data items by applying one or more rules to the one or more aggregate data items and (c) generating the information using the one or more further aggregate data items.

In an embodiment, each of the plurality of data items are associated with an identifier and a value. Each of the plurality of data items may comprise the identifier and the value. The identifier may be associated with a name or label for the data item. In an embodiment the step of generating information comprises the step of including in the information the names or labels of the data items populating the aggregate data item. The step of generating the information may comprise the step of including in the information the values associated with the data items populating the aggregate data item. The step of generating the information may comprise the step of determining the order of the names or labels in the information.

In an embodiment, the step of generating information comprises determining one or more characteristics of the aggregate data item. The step of determining characteristics may comprise one or more of determining the number of data items comprising the aggregate data item, if the aggregate data item is empty, and if the aggregate data item comprises a specific data item, if an aggregate data item does not contain a specific data item, and if aggregate data items share data items. One of the characteristics may be a value. In an embodiment, the step of generating the information comprises the step of including in the information a determined characteristic of the aggregate data item.

In an embodiment, the step of populating the aggregate data item may comprise populating the aggregate data item with one or more other aggregate data items. The aggregate data items and each of the one or more aggregate data items may be associated with an aggregate identifier. The aggregate identifiers may each be associated with aggregate names. The step of generating the information may comprise including the aggregate names. The step of including the aggregate names in the information may include the step of determining the order of the aggregate names in the information.

In an embodiment, the step of populating the aggregate data item comprises populating the aggregate data item includes the step of operating on two other aggregate data items. The step of operating may comprise one or more of difference, union and intersection of the two other aggregate data items. In an embodiment, the step of populating an aggregate data item comprises the step of determining which data items comprising another aggregate data item have values in a particular range or from a particular discrete set.

In an embodiment, the step of generating information comprise applying one or more rules to the aggregate data item. The one or more rules may form at least part of a ripple down rules knowledge system.

In an embodiment, the step of generating the information comprises the step of including in the information the identifier(s) of the data item(s) constructing the derived attribute.

In an embodiment, the step of generating the information comprises the step of including in the information the values of the data items constructing the data item.

In an embodiment, the step of generating information comprises the step of determining the order of the data item identifiers in the information.

In an embodiment, the method further comprising the step of constructing a conceptual representation of information, wherein the conceptual representation is a conclusion given by the evaluation of rules of the decision support system based on an analysis of one or more of the following:
(a) the plurality of data items;
(b) one or more derived attributes;
(c) one or more conclusions evaluated in an earlier iteration of one or more rules,
wherein construction of conclusions occurs in successive re-evaluation of the rules.

In an embodiment, the method further comprising the step of constructing conclusions,
wherein constructing conclusions occurs in iterations of rule evaluations,
wherein each successive rule evaluation makes use of conclusions constructed in earlier rule evaluations.

In an embodiment, the system for generating information from a plurality of data items, the system comprising: an aggregate data item populator for populating an aggregate data item with at least one of the plurality of data items and an information generator for generating the information using the aggregate data item.

In an embodiment, the information generator is a textual information generator for generating textual information. Alternatively, the information generator is a machine instruction generator for generating a machine instruction.

In an embodiment, the system comprises a knowledge base or Decision Support System. In an embodiment, the system comprises a data item receiver for receiving the plurality of data items. The information generator may be arranged to generate syntactically and/or grammatically correct textual information. The information generator may be arranged to generate human readable textual information. The information generator may be arranged to generate coded textual information. The coded textual information may be a machine instruction.

In an embodiment, a system for generating information from a plurality of data items, the system comprising:
(a) a preprocessor for
  i. populating an aggregate data item with at least one of the plurality of data items; and
  ii. for constructing one or more other derived attributes from the plurality of data items; and
(b) an information generator for generating the information using the derived attributes using the aggregate data item and other derived attributes,
wherein the information generator forms at least part of a decision support system,
wherein the aggregate data item is a form of derived attribute,
wherein a derived attribute is a data item constructed from the data items using a formula such that one or more high level concepts is extracted from the data items thereby allowing a condensed volume of more relevant data to be considered in generating the information, and
wherein the information so generated falls into one or more of the following groups:
  i. textual information;
  ii. a machine instruction In an embodiment, the information generator may be arranged to generate textual information forming at least part of a report. In an embodiment, the aggregate data populator may be arranged to populate the aggregate data item by applying a rule to at least one of the plurality of data items.

In an embodiment, the information generator is arranged to include in the information a name or label associated with a data item populating the aggregate data item. The information generator may be arranged to include in the information the value associated with a data item populating the aggregate data item. The information generator may be arranged to determine the order of the names or labels in the text.

In an embodiment, the system further comprising a builder for constructing a conceptual representation of information including an interpretive portion, the interpretive portion representing an operation on an aggregate data item comprising a plurality of data items.

In an embodiment, the information generator is arranged to determine the characteristics of the aggregate data item. The information generator may be arranged to include one or more of determining the number of data items comprising the aggregate data item, if the aggregate data item is empty, and if the aggregate data item includes a specific data item.

In an embodiment, the information generator is arranged to include in the information about the determined characteristics of the aggregate data item.

In an embodiment, the aggregate data populator is arranged to populate the aggregate data item with one or more other aggregate data items. The aggregate data populator may be arranged to include in the text an aggregate data item name associated with an aggregate data item. The aggregate data populator may be arranged to determine the order of the aggregate data item names in the text.

In an embodiment, the aggregate data item populator is arranged to operate on two other aggregate data items.

In an embodiment, the aggregate data item populator is arranged to determine which data items comprising another aggregate data item have values in a particular range. In an embodiment, the information generator is arranged to apply one or more rules to the aggregate data item.

In an embodiment, the information generator is arranged to consider local characteristics where the test was performed.

In an embodiment, there is provided a method of generating information from a plurality of data items, the method comprising the steps of: evaluating an outcome of one or more rules using one or more aggregate data items each comprising one or more of the data items; and generating the information according to the outcome.

In an embodiment, the information comprises textual information. Alternatively, the information comprises a machine instruction.

In an embodiment, the step of generating the information comprises the step of generating information using a knowledge base or Decision Support System.

In an embodiment, the step of evaluating the outcome of one or more rules comprises using characteristics of an aggregate data item as a basis for one or more of the rules.

In an embodiment, there is provided a system for generating information from a plurality of data items, the system comprising: an evaluator for evaluating an outcome of one or more rules using one or more aggregate data items each comprising one or more of the data items; and an information generator for generating the information according to the outcome.

In an embodiment, the information generator is a textual information generator for generating textual information. Alternatively, the information generator is a machine instruction generator for generating a machine instruction.

In an embodiment, the system comprises a knowledge base or Decision Support System.

In an embodiment, there is provided a method of generating information, the method comprising the steps of: receiving a conceptual representation of information including an interpretive portion, the interpretive portion representing an operation on an aggregate data item comprising a plurality of data items; and generating the information from the interpretive portion.

In an embodiment, the information is textual information. Alternatively, the information is a machine instruction.

In an embodiment, the step of generating the information includes the step of including in the information one or more names or labels associated with each of the data items. The step of generating the information may include the step of including in the information a collective name for the plurality of the data items. The step of including the one or more names or labels may include the step of integrating the information with a literal portion of the conceptual representation of the text.

In an embodiment, the conceptual representation is pseudo text.

In an embodiment, the step of generating the information may include the step of generating syntactically and/or grammatically correct textual information.

In an embodiment, there is provided a system for generating information, the system comprising the steps of: a receiver for receiving a conceptual representation of information including an interpretive portion, the interpretive portion representing an operation on an aggregate data item comprising a plurality of data items and an information generator for generating the information from the interpretive portion.

In an embodiment, the information is textual information, in which case the information generator is a textual information generator. Alternatively, the information is a machine instruction, in which case the information generator is a machine instruction generator.

In an embodiment, the generator is arranged to include in the information one or more names or labels associated with each of the data items. The generator may be arranged to include in the information a collective name for the plurality of the data items. The generator may be arranged to integrate the information with a literal portion of the conceptual representation of the text.

In an embodiment, the generator may be arranged to generate syntactically and/or grammatically correct textual information.

In an embodiment, the present invention provides a computer program comprising instructions for controlling a computer to implement a method in accordance with the first aspect of the invention.

In an embodiment, the present invention provides a computer readable medium providing a computer program in accordance with the seventh aspect of the invention.

In an embodiment, the present invention provides a computer program comprising instructions for controlling a computer to implement a method in accordance with the third aspect of the invention.

In an embodiment, the present invention provides a computer readable medium providing a computer program in accordance with the ninth aspect of the invention.

In an embodiment, the present invention provides a computer program comprising instructions for controlling a computer to implement a method in accordance with the fifth aspect of the invention.

In an embodiment, the present invention provides a computer readable medium providing a computer program in accordance with the eleventh aspect of the invention. The term "server" in this specification is intended to encompass any combination of hardware and software that performs services for connected clients in part of a client-server architecture.

The client and a server may be separate software running on a single piece of hardware or a plurality of connected pieces of hardware.

In a preferred embodiment, the invention thus provides a computer-enabled method and system for generating text (such as a textual report) that overcomes at least some of the limitations of traditional expert systems, by providing means capable of interpreting large volumes of complex data, including numeric and textual data obtained from disparate sources. In an embodiment, the invention further provides means to interpret data presented in various forms, including as freeform text.

BRIEF DESCRIPTION OF THE FIGURES

In order to achieve a better understanding of the nature of the present invention, embodiments of a method and system for generating textual information will now be described, by way of example only, with reference to the accompanying Figures and examples in which:

FIG. 18 is a window of a user interface of an embodiment of a TCA that extracts dates and Boolean values.

FIG. 19 is a window of a user interface of the embodiment of FIG. 18, showing exemplary Boolean and date values for the Key Concepts. The example shown relates to airline ticketing.

FIG. 20 is an exemplary window of a user interface of an embodiment of a TCA according to the invention, in which a Derived Attribute and the part of the raw text it represents is provided to a user as a tooltip.

Figures 1, 2, 3:
FIG. 1 is a window of a user interface showing an example of a block of text and its "normal form" using the Text Normalisation Attribute "NormCat". The example shown relates to airline ticketing.
FIG. 2 is a window of a user interface showing an example of a list of Key Terms in "NormCat" and the regular expressions defining each Key Term. The example shown relates to airline ticketing.
FIG. 3 is a window of a user interface showing two examples of comments with variables that extracted currencies and values from the normalised text. The example shown relates to airline ticketing.

Example 1 is an example of a method and system for generating text according to a preferred embodiment in the form of a leukaemia report knowledge base.

Example 2 is a further example of a method and system for generating text according to a preferred embodiment in the form of an allergy report knowledge base.

Example 3 is an example of a method and system for generating text according to an alternative embodiment in the form of an airline ticketing auditing system.

Example 4 is an example of a method and system for generating text according to an alternative embodiment in the form of log file monitoring system.

DETAILED DESCRIPTION OF EMBODIMENTS OF THE INVENTION

Table 1 is a dictionary of terms defined according to the invention. Terms defined in Table 1 are denoted with the use of capitalisation throughout the document. If a term is not capitalised then its plain meaning is to be construed, unless otherwise specified.

TABLE 1

| Term | Description |
|---|---|
| | Dictionary of defined terms |
| Attribute | One of the basic elements of a rule condition or other expression. Each Attribute has a name and an associated value, or possibly sequence of values e.g. if a time-series of values is associated with that Attribute. An Attribute represents a data value element of a rule condition e.g. a low level data item like a single allergen marker, or a higher-level aggregate data item like a pollen item. |
| Case | A collection of Attributes and their values presented to an expert system for interpretation |
| Derived Attribute | A data item that is not present in the original data presented to the knowledge base for interpretation, but is constructed from this data using some formula |
| Derived Match | See Key Concept |
| Key Concept | A significant feature embedded in free text that will be used by an expert or expert system when interpreting the free text. A Key Concept is a unique higher-level code referring to a sequence of Key Terms. Several variants of Key Term sequences may map to a single Key Concept |
| Key Term | A unique code representing a fragment of the free text. A Key Term may include a variable component |
| Keyword | See Key Term |

TABLE 1-continued

Dictionary of defined terms

| Term | Description |
|---|---|
| Matching Form | A sequence of Key Terms |
| Primary Attribute | A data item in the original data presented to the knowledge base for interpretation |
| Sample Sequence | An ordered, timed list of values for any Attribute. Each value in a Sample Sequence is associated with a date and a time. |
| Text Condenser Attribute (TCA) | A new tool in some embodiments that is a form of Derived Attribute that defines a set of keywords (or 'Key Terms'), along with a set of Key Concepts or 'derived matches'. |
| Text Normalisation Attribute (TNA) | A type of Derived Attribute used to transform free text into a sequence of Key Terms. |
| Textual | Any human readable information (e.g. text, numeric data, characters) or machine readable information |

In a preferred embodiment, the invention provides a computer-enabled method and system for generating information (such as a textual report) that overcomes at least some of the limitations of traditional expert systems, by providing means capable of interpreting large volumes of complex data, including numeric and textual data obtained from disparate sources. In an embodiment, the invention further provides means for interpreting data presented in various forms, including a free-text analyser means to enable interpretation of data presented in freeform text.

Figure 4:
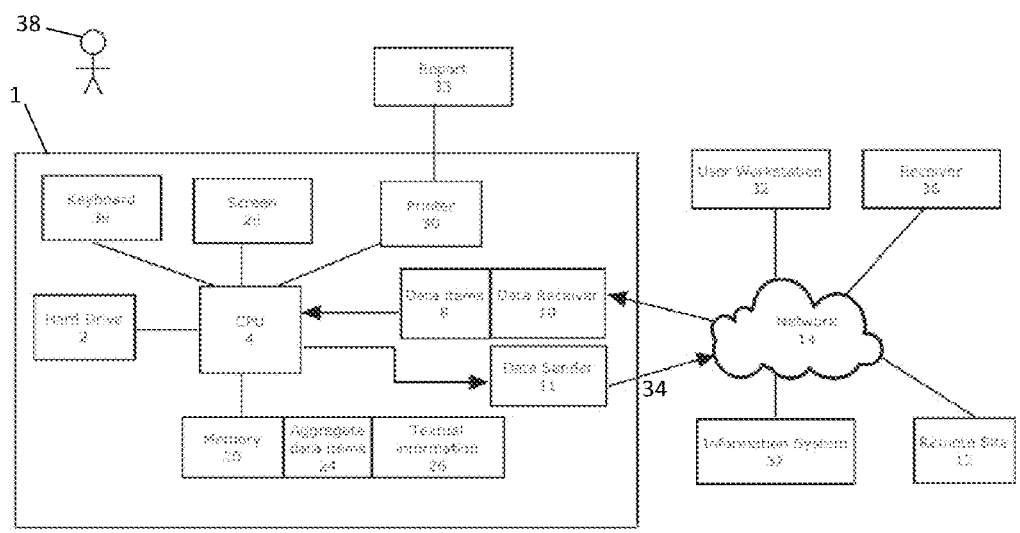
FIG. 4 is a block diagram of one embodiment of a system for generating text, or textual information, such as a textual report.
Figure 5:
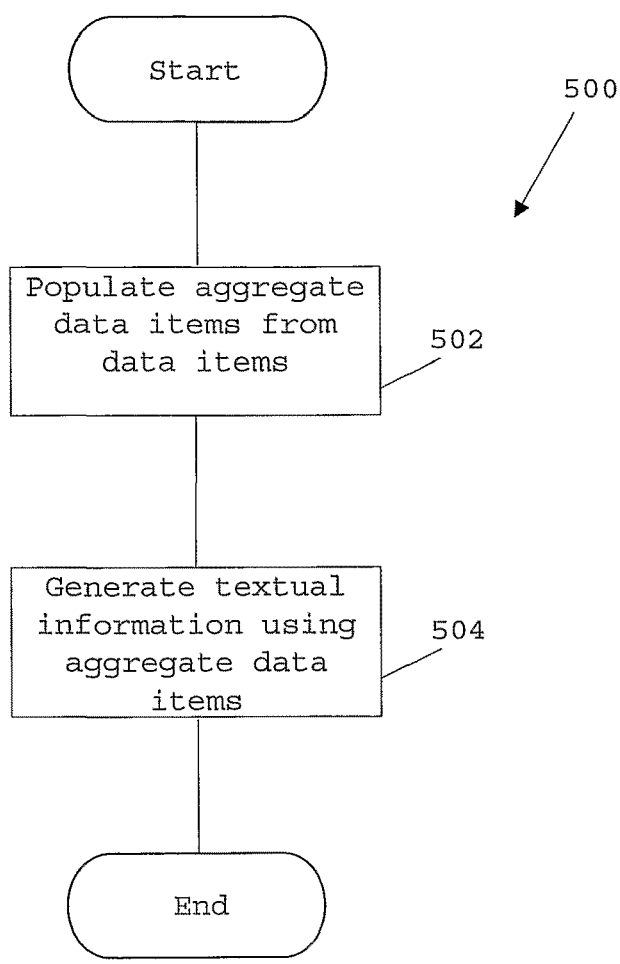
FIG. 5 is a flow diagram of one embodiment of a method of generating text, or textual information, such as a textual report.

FIG. 4 is a block diagram of one embodiment of a system for generating text from a plurality of data items and is generally indicated by the numeral 1. The system 1 may comprise any system able to process information, and in this embodiment may be described as a computer system 1 including a computer program residing on computer readable medium 2 comprising instructions for controlling a central processor 4 of the system, the instructions being to implement a method 500 for generating textual information such as information in a textual human-readable report from a plurality of data items. A flow diagram of the method 500 is shown in FIG. 5.

Alternatively, the information generated is one or more machine instructions rather than textual information presented as a report, and the components of the system 1 are modified accordingly. It is to be understood that the term "textual information" is to be read more broadly to encompass this alternative embodiment where appropriate hereafter.

Referring to FIG. 4, the computer readable medium 2 includes a non volatile memory 2 in the form of a hard drive disk 2 connected to the processor 4 by a suitable bus 6 such as SCSI. In some embodiments the non volatile memory 2 includes FLASH memory, a CD, DVD, or a USB Flash memory unit, for example.

2. The one or more data items 8 are received via a data receiver 10 which is a part of a communications interface to other systems or users which originate those data items. The receiver is enabled to receive a plurality of one or more of the following:
 (a) data items;
 (b) derived attributes;
 (c) conclusions.

Each data item 8 represents the input data to be processed such as results from one or more tests from an investigation, or any other simple or complex data that requires processing.

Such processing is enabled to be performed by a builder for constructing a conceptual representation of information including an interpretive portion, the interpretive portion representing an operation on an aggregate data item comprising a plurality of data items. In some embodiments, the source of the data items is an information system 37 external to 1.

The generated textual information 26 is sent via a data sender 11 (termed a sender) which is part of a communications interface to other systems or (a recipient such as one or more users) which require the textual information. In some embodiments, the destination of the textual information is an information system 37 external to 1. The sender sends the generated information to one or more of:
 a) a machine;
 b) a recipient.

Figure 6:
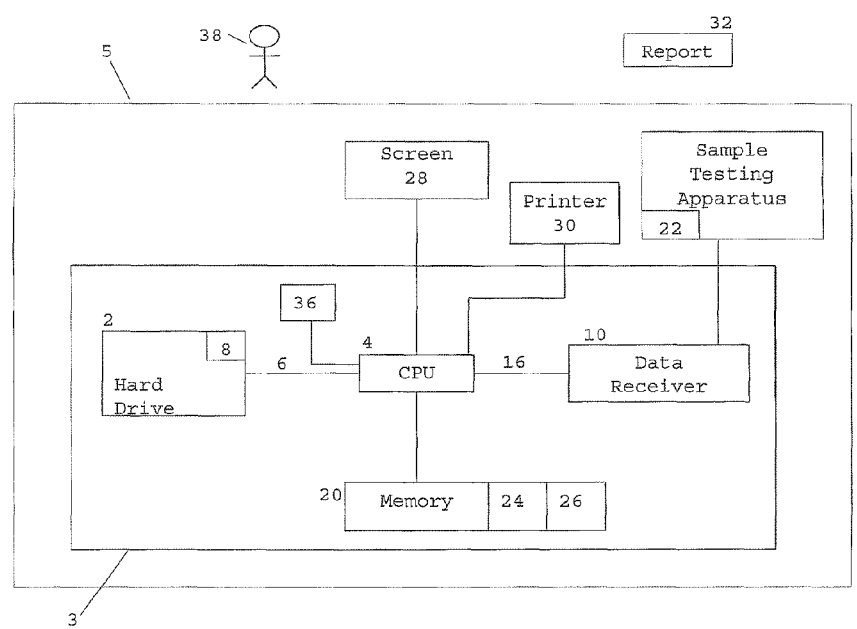
FIG. 6 is a block diagram of another embodiment of a system for generating text, or textual information, such as a textual report.

In some embodiments such as that shown in FIG. 6, the system 3 is an embedded system. The components in FIG. 6 similar to those of the system 1 of FIG. 4 are similarly numbered. The embedded system 3 in this embodiment forms part of an instrument for carrying out a test such as a medical test. It will be appreciated that any suitable architecture, such as terminal/mainframe, client/server, cloud computing could be used and not only those illustrated.

In the embodiments shown in FIGS. 4 and 6 the computer readable medium (e.g. hard drive) 2 holds the computer instructions for defining the aggregate data items, other Derived Attributes, and the rules for generating textual information.

In general terms, a 'Derived Attribute' is a data item that is not present in the original data presented to the knowledge base for interpretation, but is constructed from this data using some formula. The formula is based on any of the following considerations:
 (a) identifiers of data items or other derived attributes;
 (b) values of data items or derived attributes;
 (c) multiple instances of a data item or derived attributes presented in:
  i. a time-based sequence;
  ii. any other vector format;

An aggregate data item is one example of a Derived Attribute. The original (or 'primary') data is presented as a map of data item to value pairs. If historical data is considered, the original data is presented as a map of data item to a time-based sequence of values for that data item. The data items in the original data are called 'Primary Attributes'.

A Derived Attribute represents a higher-level concept that can be used more naturally and more generally in rules and reports than a Primary Attribute. For example, a Primary Attribute might be the name of the referring doctor. A more useful Derived Attribute may be the Derived Attribute 'specialist' which has the value 'true' if the referring doctor's name matches a name on a list of specialist doctors. Another example would be the Primary Attributes which are patient height and patient weight. A useful Derived Attribute may be the Attribute 'BMI' constructed from a numeric value evaluated as the ratio of weight to the square of the height.

Figure 7:
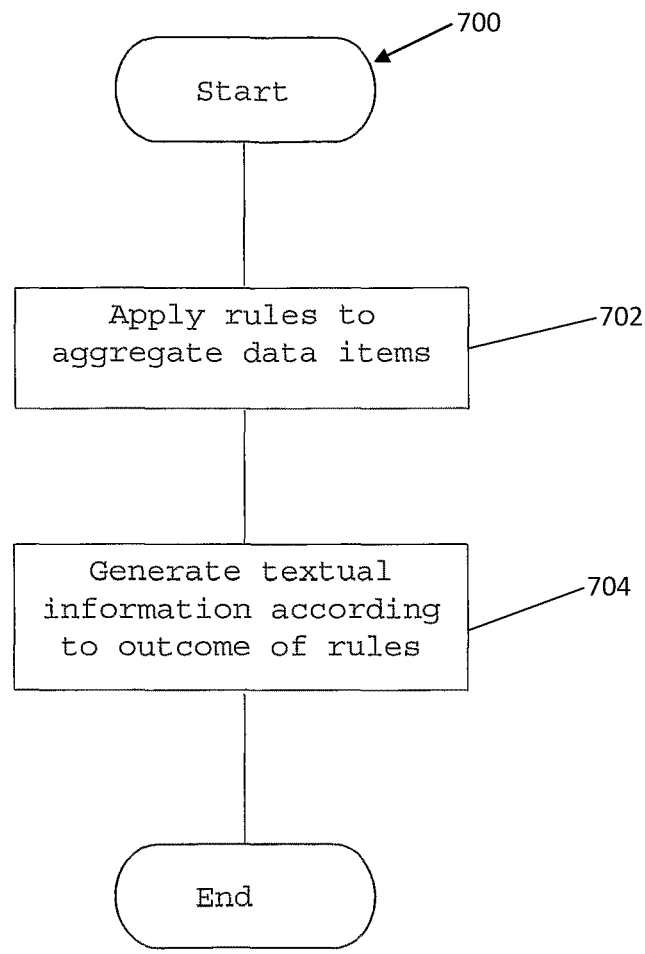
FIG. 7 is a flow diagram of another embodiment of a method of generating text, or textual information, such as a textual report.

Referring to FIGS. 4 and 6, the system 1 is arranged to process the data items 8 by performing the method of generating text illustrated in FIGS. 5 and 7.

Alternatively data items 8 may relate to any expert domain such as real estate valuation. Relevant data items 8 for a real estate "test" or evaluation may include, for example, house and land size, house orientation, postcode and recent valuations of nearby or other comparable properties. Other examples of expert domains include one or more of fraud detection, bone mineral density reporting, medical alerts, genomic, molecular, and allergy reporting. The systems 1,3 and methods 500 described here may be arranged to pre-process such data items 8.

In the exemplary embodiment of FIG. 4, the system 1 has a data receiver 10 for receiving the data items 8 which may or may not be subsequently stored on the hard drive (or other computer readable medium) 2. In an embodiment where the tests have been done remotely from the system 1, for example at a remote site 12, the system 1 may be arranged for connecting to a network 14 to which the remote site 12 is also connected. The network 14 may be a wide area network such as the internet or the cloud, although it will be appreciated that the remote site 12 may be far closer, for example, a room adjacent the system 1 in which case the network 14 may be a local area or wireless network such as WiFi or WLAN. Alternatively, in cases as shown in FIG. 6 where the system 3 is part of a test instrument 5, the data receiver 10 may act as an interface between the processor 4 and the data source 22 such as a sample testing apparatus of the system 3 that performs the physical, chemical or biological test on a sample or other analysis.

The processor 4 (FIGS. 4 and 6) is programmed as an aggregate data item populator for populating an aggregate data item 24 with at least one of the plurality of data items 8 stored on the hard drive 2 (or other computer readable medium). The aggregate data item 24 is in one embodiment, a type of data structure (e.g. any form of suitable data structure such as files, lists, arrays, trees, records, tables for use in a database, flat files, or indexing systems) of a memory 20 for processing by the processer 4. The data items 8 may also be stored in the memory 20. The memory 20 in this embodiment comprises one or more of CPU registers, on-die 8RAM caches, external caches, DRAM and/or, paging systems, virtual memory or swap space on the hard drive (or other computer readable medium) 2, or any other type of memory. However, embodiments may have additional or less memory types as suitable.

The processor 4 is programmed to be an information generator for generating information 26 (e.g. as a text report or as one or more machine instructions) using the aggregate data item 24. The information generator 4 is arranged to store the so generated information 26 in the memory 20. The textual information 26, in this embodiment, represents human readable text that is syntactically and/or grammatically correct.

The output of the system 1, 3 is the textual information, preferably in a human readable form such as one or more of text (e.g. a textual report) printed to a monitor or screen 28, text printed by a printer 30 onto a paper report 33, and an email or other type of electronic message 34 sent via the data sender 11 over the network 14 to a user's workstation 32, such as a physician or surgeon's computer, or to another information system 37 for example. The textual information generated by the processor 4 may be textual information such as some other decision support outcome derived from the data items 8. In one embodiment, a SMS gateway (or other SMS transit mechanism) 34 is instructed by the system 1 to send an electronic message, such as an SMS or email, including the textual information 26 in human readable form (i.e. syntactically and/or grammatically correct text) to a receiver 36 such as an electronic device. The device 36 may be a mobile telephone, smart phone, PDA or other handheld electronic device, any other computing device with processing capacity. In an embodiment, the system 1 is arranged to send instructions to send an SMS to a handheld mobile device 36. This is advantageous when a test result is abnormal and requires immediate follow up, or if the outcome of a test (e.g. when auditing airline tickets) is required quickly.

Referring to FIG. 5, an embodiment of a method 500 for generating text such as information in a textual report from a plurality of data items is shown. The processor 4 (FIGS. 4 and 6) acting as the aggregate data populator is programmed to populate the aggregate data item 24. Referring to FIG. 7, another embodiment of a method for generating text is shown. The method includes a substep of populating an aggregate data item (labelled 24 in FIGS. 4 and 6) by applying one or more rules to at least one of the plurality of aggregate data items.

The rules may form at least part of a rule-based knowledge/expert system or decision engine. An example of a suitable rule knowledge system is the proprietary system known as RippleDown, as disclosed in the specification of the applicant's U.S. Pat. No. 6,553,361 which is incorporated herein by way of reference. The collection of rules is a knowledge base that is built up by an expert as described in the US specification. The rules may be domain specific. For example, the rules may be specific to the domain of allergy testing, or the domain of leukaemia testing. In some other instances, however, the rule is a rule specific to the case, that is, a rule specific to a set of related test results/data items 8. In this case, the system 1 is a knowledge base or decision support system.

Referring to FIGS. 4 and 6, in one case, the data items 8 have associated name or label parts and value parts—for example, as follows:

milk, 25;

soya, 30; and peanut, 0.

Each of the data items 8 is associated with an identifier (here, milk, soya or peanut) and a value (here, 25, 30 or 0). In these embodiments, each of the data items 8 comprises the identifier and the value. The identifier is, in this example, a name or label for the data item (say, "milk") that can be used for generating the textual information 26—e.g. see step 504 in FIG. 5. The system includes rules that allow the identifier to be translated and/or expressed in a specified:

(a) language (when the information generated is human readable); or (b) an instruction format (when the information generated is machine instructions).

This enables the information generated to be generated in a language/format appropriate to the context or as otherwise determined by the rules.

An aggregate data item 24 having a name or label very high food allergens may be populated (e.g. see step 502 in FIG. 5) from the above data items 8 by a rule such as:

If milk>25 then include milk in very high food allergens AND

If soya>25 then include soya in very high food allergens AND

If peanut>25 then include peanut in very high food allergens.

Alternatively, an aggregate data item 24 (FIGS. 4 and 6) having a name or label very high food allergens may be populated from the above data items 8 by applying a data preprocessing operation (e.g. see step 702 in FIG. 7) such as:

very high food allergens is food allergens in range (25, 100)

The generation of information from a plurality of data items is also enabled to include:
(d) a preprocessor for
  i. populating an aggregate data item with at least one of the plurality of data items; and
  ii. for constructing one or more other derived attributes from the plurality of data items; and
(e) an information generator for generating the information using the derived attributes using the aggregate data item and other derived attributes,
wherein the information generator forms at least part of a decision support system,
wherein the aggregate data item is a form of derived attribute,
wherein a derived attribute is a data item constructed from the data items using a formula such that one or more high level concepts is extracted from the data items thereby allowing a condensed volume of more relevant data to be considered in generating the information, and
wherein the information so generated falls into one or more of the following groups:
  iii. textual information;
  iv. a machine instruction The processor 4 (FIGS. 4 and 6) is also programmed as an evaluator for evaluating the outcome of the one or more rules, as exemplified above, using one or more aggregate data items, such as 24. The textual information generator 4, in the above example, generates textual information for the report 33, for example, according to the outcome of the rules.

Thus the processor 4 (FIGS. 4 and 6) is capable of functioning as one or more of:
(a) an aggregate data item populator for populating one or more aggregate data items 24 with individual data items 8;
(b) an evaluator for evaluating the outcome of the one or more rules as applied to aggregate data items 24; and
(c) a textual information generator for generating textual information 26 (e.g. as a text report or as one or more machine instructions) using the aggregate data item 24.

It will be appreciated that the processor 4 (FIGS. 4 and 6) may test each data item 8 in turn for inclusion in the aggregate data item 24. It will also be appreciated that the exemplary embodiments of the system for generating text (as depicted in FIGS. 4 and 6) may include more than one processor 4 performing the outlined functions in parallel or in series.

In the exemplary case outlined above, one conceptual representation of the aggregate data item (labelled 24 in FIGS. 4 and 6) having the name very high food allergens would be:
  milk, 25; and
  soya, 30.

The textual information generator 4 (FIGS. 4 and 6) may be arranged to include in the textual information 26 the name or label associated with a data item 8 populating the aggregate data item 26. For example, the processor 4 may be asked to form the textual information (e.g. in step 504 of the method illustrated in FIG. 5):
  Very high results were found for very high food allergens.

Continuing the same example, the processor 4 functioning as a textual information generator 4 is able to generate textual information representing the text:
  Very high results were found for soya and milk.

The textual information generator (processor) 4 has determined that soya has a higher value than milk and thus the best way to present this text is to order the names or labels in the text so that soya is superior. Also, the generator 4 has determined that an and should be placed between soya and milk because there are only two items in this aggregate data item 24. If there was a third item in the aggregate data item 24, such as honey with a value of 26, then the generator 4 would contain machine instructions that would enable it to determine that one grammatically correct text to generate would be:
  Very high results were found for soya, honey and milk.

The textual information generator 4 is arranged, as required, to include in the textual information 26 the value associated with a data item 8 populating the aggregate data item 24. For example, the above text may instead be:
  Very high results were found for soya (30), honey (26) and milk (25).

The above are examples of one commonly required ordering, but there may be others in different circumstances.

Another such example is: in order to generate a patient test report for a referring physician, a laboratory pathologist may have to interpret the results of, say, hundreds of protein biomarkers used in the diagnostic instrument that has analysed a patient's blood sample. To make such an interpretation possible, the system for generating text arranges the biomarker results into sub-groups, each of which can be considered as a higher-level marker with some diagnostic significance. For example, one group of biomarkers may test for the specific BCC form of leukaemia, whilst another group may test for the specific AML form of leukaemia.

The system for generating text thereby reduces data complexity by deriving a single result from all of the biomarker results in each sub-group, e.g. a single value representing the combined result of the BCC group of markers and a single value representing the combined result for the group of AML markers. The results of the patient's blood sample is now amenable to interpretation by a laboratory pathologist who only needs to consider the far fewer, but high-level markers.

As well as simplifying the interpretive process, the report generated by the system for generating text and provided by the pathologist to the referring physician is simplified by using the result values corresponding to the groups of markers rather than individual marker values. A report written in terms of groups of markers is more concise and suffers less variation due to changes in values of individual marker values themselves.

The advantages in grouping markers allows an expert system to be built requiring far fewer rules as it can follow the human expert's interpretive process and inference of group values rather than if all rules need to refer to individual marker values. Similarly, a large variety of reports can still be generated by the expert system with far fewer report types needing to be defined by the human expert as the reports can be written in terms of groups of markers and their group values rather than specific marker values.

A large number of data item values can also arise from the need to take an historical (time-based) view of a data item.

For example, a pathologist monitoring cardiac enzyme results values, e.g. Troponin, may need to interpret the current result against all previous results for the past several weeks in order to assess whether to alert an emergency response team. The data volume and complexity is reduced by providing a new, high-level result which represents a rate of change in this time series and so summarises the important feature of the whole time series as regards the current value. The pathologist can then interpret the significance of the current result in the context of this high-level, trend result.

In some embodiments, the textual information generated does not generate textual information in human readable form (i.e. syntactically and/or grammatically correct text), but rather text in the form of one or more machine instructions. In this case, the system includes a machine instruction generator. The machine instruction can control workflow. For example, if the test results show that no allergens were detected, then the machine instruction may cause the system to automatically send a report without it being checked by a human evaluator. Alternatively, the machine instruction may cause or instruct additional tests to be carried out on held samples before the report is generated.

Figure 8:
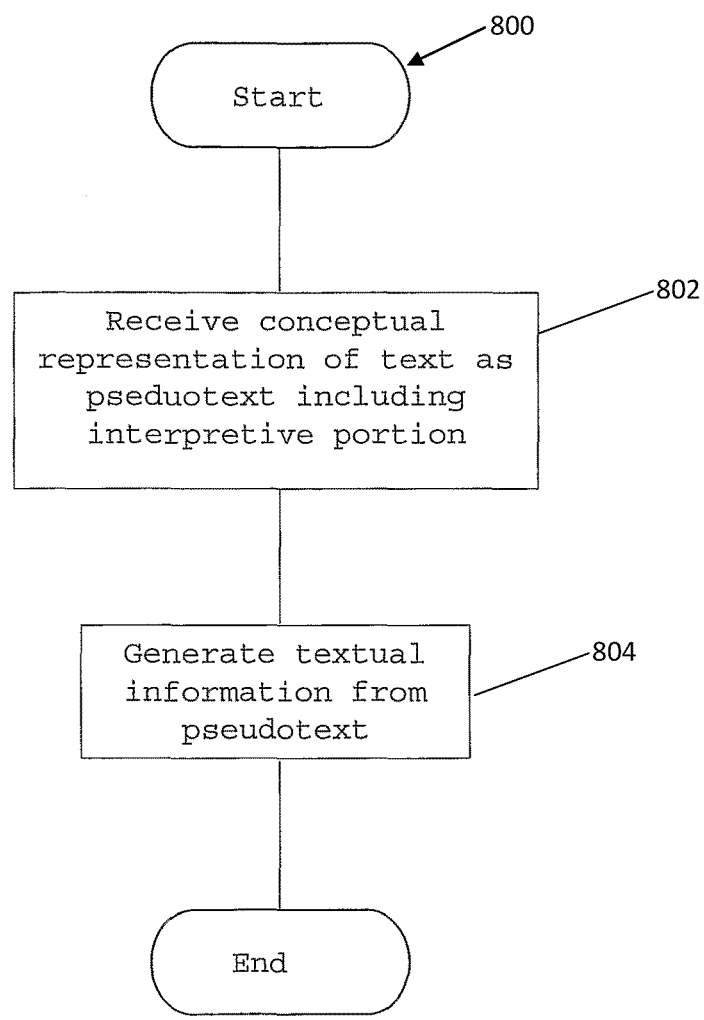
FIG. 8 is a flow diagram of yet another embodiment of a method of generating text, or textual information, such as a textual report.

In another embodiment, the system 1,3 (FIGS. 4 and 6) may include a receiver 36 for receiving a textual report or other output. Referring to FIG. 8, an alternative embodiment of the method for generating text includes the step of allowing the user 39 to enter via keyboard or other input device connected to the CPU a conceptual representation of text (step 802). The conceptual representation is stored by the system in non-volatile memory 2. The "conceptual representation" is the expression of a rule condition in terms of the original data items or the derived attributes (derived data items) including aggregate data items. Using the above example, the conceptual representation entered by the operator is in the form of "pseudotext":

Very high results were found for very high food allergens.

The pseudotext in this example is a compact, informal description of a conclusion/decision based on analysis of the collated individual test results. The pseudotext represents a high-level description of the text desired by the operator, but importantly omits details intended for the system 1,3 to calculate. It is a natural language description of the computational details. Pseudotext is easier for humans to formulate and read than a more technical description of the desired text which may be achieved using programming or scripting languages.

The conceptual representation includes an interpretive portion, which in this case is:

very high food allergens

The interpretive portion represents an operation on the aggregate data item with the name very high food allergens. Referring to FIG. 8 (step 802), in one embodiment of the method of generating text 800, the system 1,3, a user 38 has entered a conceptual representation of text as pseudotext including an interpretive portion. On receipt of data items 8, the textual information generator 4 generates the textual information 26 from the interpretive portion as described elsewhere in this document (see step 804, FIG. 8). The textual information generator 4 is arranged to include in the textual information 26 one or more names or labels associated with each of the data items 8. The textual information generator 4 may further be arranged to include in the textual information 26 a collective name (identifier) for the plurality of the data items. The textual information generator 4 may be arranged further still to integrate the textual information 26 with a literal portion of the conceptual representation of the text, which in this exemplary case is:

Very high results were found for soya, honey and milk.

In the embodiments shown in FIGS. 4 and 6, the textual information generator 4 is arranged to determine the characteristics of the aggregate data item 24. For example, the textual information generator 4 may be arranged to include one or more of:

(a) determining the number of data items comprising the aggregate data item;
(b) determining if the aggregate data item is empty; and
(c) determining if the aggregate data item includes a specific data item.

These are examples of operations on the aggregate data item in embodiments of the method and system for generating text. For example, textual information 26 is generated from pseudotext (step 804 in FIG. 8) such as:

Very high results were found for number of very high food allergens food allergens.

which becomes:

Very high results were found for 3 food allergens.

Thus, the textual information generator 4 is arranged to include in the textual information 26 information about the determined characteristics of the aggregate data item. Number of is a type of operation acting on the aggregate data item very high food allergens.

The aggregate data populator 4 (FIGS. 4 and 6) may be arranged to populate the aggregate data item 24 with one or more other aggregate data items. The former aggregate data item may comprise data items which are related—for example, all foods to which a patient is found to be highly allergic. Thus the aggregate data item "food" might be populated with data items (e.g. nuts), which are in turn aggregate data items (e.g. peanuts, tree nuts; tree nuts in turn may encompass data items such as almonds, Brazil nuts, walnuts, hazelnuts, macadamias, pistachios, pecans, and cashews).

The aggregate data populator 4 may be arranged to include in the text an aggregate data item name (identifier) associated with an aggregate data item. The aggregate data populator 4 may be arranged to determine the order of the aggregate data item 24 names in the text. In an embodiment, the aggregate data item populator 4 is arranged to operate on two or more other aggregate data items 24. For example, one aggregate data item 24 may be the very high result food allergens, and the other may be food allergens of interest. The populator 4 may then generate a new aggregate data item 24, for example the very high result food allergens of interest, by taking the intersection of the two aggregate data items. Other possible operators include difference, union and intersection. In another embodiment, the aggregate data item populator 4 is arranged to determine which data items comprising another aggregate data item have values in a particular range.

In an embodiment, the step of generating the textual information 26 comprises the step of including in the textual information 26 information about the determined characteristics of the aggregate data item 24. For example, if the determined characteristic is the maximum value of the items comprising the aggregate data item, the textual information may include the sentence "The highest pollen allergen was <highest pollen allergen> with result <value of highest pollen allergen> mmol/L" where <highest pollen allergen> is the characteristic of the pollen allergen aggregate data item defined as that allergen with the highest value, and <value of highest pollen allergen> is the value itself.

In some embodiments, the textual information generator 4 is arranged to apply one or more rules to the aggregate data items 24 (e.g. refer step 702 in FIG. 7) to control program flow. An example logical test associated with such a rule is:

If number of Moderate foods >1 AND if number of Symptoms >1 AND number of very high foods+number of foods=0

The workflow action associated with such a rule may be to queue the test results and report to a Pathologist for review, rather than automatically releasing the report to the referring physician.

It will be appreciated that aggregate data items can in turn be treated as data items for generating textual information 26 when used in the evaluation of the Boolean conditions comprising the rules. Populating the aggregate data 24 item may include populating the aggregate data item 24 with one or more other aggregate data items, each of which may have an associated aggregate identifier in the form of a name or label.

Populating the aggregate data item (e.g. step 502 in FIG. 5) may be achieved by combining two or more other aggregate data items (e.g. union or intersection operations), or through the application of more general conditions such as determining which data items comprising another aggregate data item have values in a particular range (e.g. the pollen items in range [20-50]).

The aggregate identifier (name or label) can then be used in the textual information 26 just as for the case of using data item names in the textual information 26. Again, the order of the aggregate names in the textual information 26 may be determined by the textual information generator 4.

Some embodiments of the system and method include a new or improved data preprocessing method for reducing data complexity prior to interpretation by the Knowledge Base, including the steps of:
 (a) grouping individual data items into one or more subsets of data (each subset group being referred to as an aggregate data item);
 (b) calculating a statistical value (e.g. a maximum value, minimum value, group size, median, mean, mode or any other statistical value), or other numeric, Boolean, or textual value for each aggregate data item (hereafter, an "aggregate" value);
 (c) performing further specified operations (e.g. union, intersection) on collections of aggregate data items to generate other aggregate data items. For example, the union of aggregate data items 'BCLL Diagnostic', 'AML Diagnostic', 'BCLL Supporting', 'AML Supporting', each representing a collection of specific cancer markers, may represent another aggregate data item 'Leukaemia' which consists of all leukaemia cancer markers;
 (d) creating one or more data items and values from a data item whose value consists of free-form text; and/or
 (e) creating one or more data items and values from a data item which is associated with a sequence of values.

One aspect of the data pre-processing method thereby considers a collection of individual data items and their values, and by grouping, filtering, mapping, correlating or other process reduces the complexity in this data by creating Derived Attributes, including aggregate data items, each with a value.

Another aspect of the data pre-processing method considers complex freeform textual values of a data item and by a process of string pattern matching and filtering reduces the complexity by creating other, simpler data items, each with a value.

Another aspect of the data pre-processing method considers data items associated with a sequence of values and by a process of filtering, trend analysis, or other analysis reduces the complexity by creating other simpler data items, each with a value. The method also enables consideration of a single derived data item and its value, where a "derived" data item and its value refers to a data item and value constructed by the pre-processing, and includes "aggregate" data items, rather than needing to consider each individual data value in the original set of data items, or the complex data item values which are freeform text or sequences. This significantly reduces the volume and complexity of data values that need to be interpreted, and hence the number of rules and decision points needed, in order to reach a judgement or conclusion (which is then expressed in a generated textual report). The aggregate data items and their values can also be used as outputs of the Knowledge Base, greatly reducing the complexity of the resulting report text.

In an alternative embodiment, the system and method of generating text further include means to interpret data presented in various forms, including free-text analyser means to enable interpretation of free-text data items. The free-text analyser means performs a method of pre-processing free-text data items including the step of mapping "regular expressions" in textual data to one or more of the following groups:
 (a) a sequence of key words, enabling a significantly simpler "canonical" representation of a data item to be considered, rather than needing to interpret a lengthy free-text data item;
 (b) assigning complex text data item to a number of simpler "atomic" data items, where the value of each atomic data item is one of the following:
  i. Boolean (e.g. true or false, yes or no);
  ii. a finite enumeration ("a", "b", "c"); or
  iii. a numeric value.

By delivering a new or improved method for pre-processing of complex data items as described herein, the preferred embodiments overcome at least some of the limitations of traditional expert systems and enable the interpretation of large volumes of complex data, including numeric and textual data obtained from disparate sources and presented in various forms, including as freeform text. The preferred embodiments translate the complex data into knowledge or a judgement (including a conclusion, result or other finding based on the interpreted data). The knowledge or judgement is expressed as textual information (including machine instructions) in a textual report.

The data pre-processing method reduces data complexity to a manageable level by filtering, grouping, mapping and other operations. For example, if there are several hundred protein biomarker test values to be interpreted, a filtering operation may mask out certain results that are not relevant to a specific patient. The method also involves taking one or more data items and applying a formula to process those data item(s) into derived attributes. Derived attributes are more manageable because they extract the higher level, more important information from the original data items and thus reduce and make more manageable the data to be interpreted. The data pre-processing method includes a grouping operation in which relevant data items are grouped into one or more subsets of data—each subset group being referred to as an aggregate data item. Continuing with the current example, the grouping operation may collect the values of particular subsets of related biomarkers and calculate a statistical value, say a maximum value, for each subset. So instead of having to interpret individual biomarkers, the method and system for generating text need only to consider a single data value for each group, significantly reducing the number of data values to consider.

If a particular data item is complex, such as a textual clinical history for a patient or other textual data, a mapping operation may look for patterns in the text ("regular expressions") and map these patterns to a sequence of key words. So instead of having to interpret a lengthy free-text data item, the method and system for generating text need only to consider a significantly simpler "canonical" representation of this text item. Multiple variations of a clinical history may result in the same, simple canonical representation, allowing easier interpretation again allowing an interpretation to be made using significantly fewer rules and decision points.

Instead of assigning patterns of text to key words, another example of mapping would be to assign the complex text data item to a number of simpler "atomic" data items, that is, where the value of each atomic data item is a Boolean ("true" or "false", yes or no) or a finite enumeration ("a", "b", "c") or a numeric value. An example of an atomic data item assigned from a complex clinical history could be a data item called "diabetic status" with values either "true" or "false". Another example could be a data item called "diabetic drugs" with enumerated values "Biguanides", "Meglitinides", or "Sulfonylureas". In this way, selected important concepts contained within the clinical history are extracted and represented in another canonical fashion.

In all these examples, complex data is pre-processed into simpler data items in order to facilitate interpretation.

In an embodiment of the invention an aggregate data populator device or tool (such as a database structure) receives a plurality of data items, each data item, say corresponding to the result of one of a plurality of tests. In typical examples, the plurality of test results is used in:

(a) an investigation of a patient's condition, such as does the patient have a particular form of disease or allergy;

(b) an audit of a substantial volume of data, say as required when determining whether or not to re-issue an airline ticket; or (c) essentially any analysis that requires a large amount of complex data items (including enumerated and numeric data in textual reports) to be analysed in order to extract information or reach a decision.

Returning to FIG. 5 and our protein biomarker test example, test values from a plurality of protein biomarker tests are grouped into subset data groups (aggregate data items). In other words, each aggregate data item is populated from the pool of individual protein biomarker test values (step 502).

In this embodiment of a system for text generation, the device (aggregate data item populator) includes information in the form of a predefined data structure relating the various types of data items with the appropriate aggregate data item(s). This data structure allows the device to populate the predefined aggregate data items with one or more of the received data items by applying various rules which process the received data. In other words, the aggregate data item populator populates the relevant aggregate data item by mapping individual data items to the relevant aggregate data item. The "aggregate data item populator" includes a set of rules to determine how individual data items should be mapped. The individual data items (including primary attributes and derived attributes) are mapped to an aggregate data item by name, type, value or by membership of another set. In other words, aggregate data items are populated with individual data items according to set membership. In the current example, each data item in one of the aggregate data items are relevant biomarkers for, say a particular disease or allergy. Using the airline faresheet example, each data item in one of the aggregate data items could be relevant conditions for, say ticket reissue.

In an alternative embodiment (see FIG. 9, step 902), the step of pre-processing data includes a method for extracting data expressed in freeform text (described in greater detail later in this document—step 902). For the purposes of this part of the discussion, an embodiment of the system and method for generating text includes means for extracting data expressed in disparate ways including in freeform text using a text condenser Attribute. Data items so extracted are subsequently processed in a similar manner as other data items (e.g. numeric data items received by the system that relate to individual test results or individual items of reported/recorded data such as a credit card expiry date or airline ticket issue date).

Referring to step 702 of FIG. 7, further aggregate data items may then be populated by other rules acting on the aggregate data items. The further aggregate data items may, for example, include data items that have a significant value. Further rules are then applied to the further aggregate data items. An example rule may include determining whether the number of significant data items in a further aggregate data item exceed a threshold value. The outcome of the rule may indicate a positive test result, in which case appropriate text reporting a positive, or otherwise, test result is generated. The text may be generated in a flexible case-by-case basis, without requiring a rule for each case, through use of aggregate data items.

Figure 9:
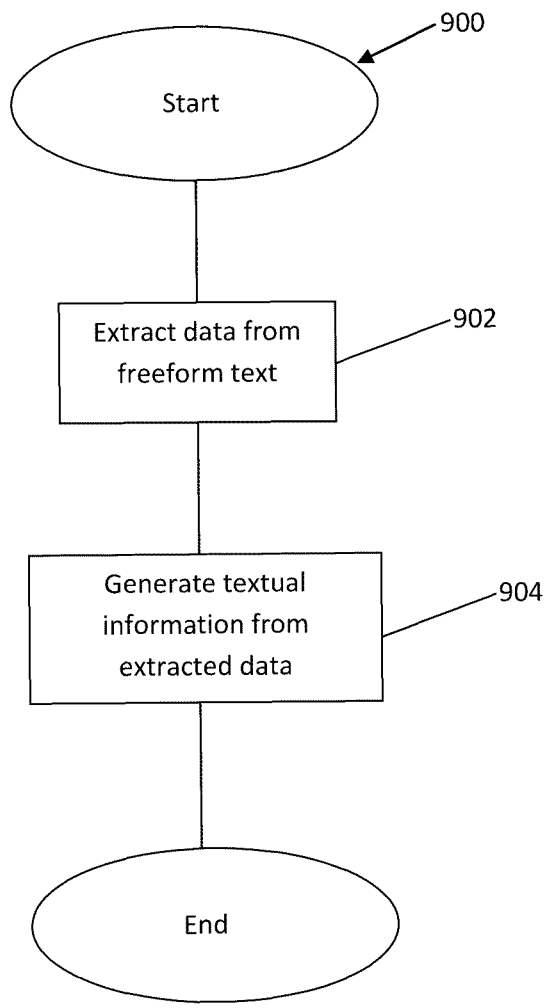
FIG. 9 is a flow diagram of a third embodiment of a method of generating text, or textual information, such as a textual report.

Referring to FIG. 9, an alternative embodiment 900 of a method of generating text is shown, including the step of extracting data from disparate sources (step 902), including data expressed in freeform text (e.g. clinical notes, airline faresheets, real estate advertisements). The method enables analysis of blocks of free text containing relevant information expressed in a variety of ways. Information (e.g. numeric data or other information) extracted from the free text is then analysed along with other data to reach a conclusion or judgement (step 904). For example, clinical notes may contain important information expressed in free text and must be interpreted in conjunction with pathology tests and demographic data.

In an airline ticketing environment, a first attempt by the inventors to solve the problems arising from the need to interpret free text involved creating a Derived Attribute called a 'Text Normalisation Attribute' (TNA). A TNA transforms the free text into a sequence of Key Terms. A 'Key Term' is a unique code representing a fragment of the free text. Key Terms may include a variable component, e.g. a currency value. Several variants of a free text fragment may map to a single Key Term. The mapping of free text to a sequence of Key Terms provides a canonical representation of that free text.

The TNA enabled each Key Term to be defined according to its multiple forms—that is, by the variant phrases for the Key Term. The output of the Derived Attribute was a string of 'condensed' or 'normalised' text, consisting of Key Terms extracted from the freeform text. FIG. 1 shows a user interface displaying a typical block of text and its 'normal form' as defined by a TNA. The TNA is essentially a map of regular expression to Keyword, as shown in FIG. 2.

The relevant Key Terms were listed in a table, and for each Keyword there was a list of matching regular expressions. Next, the raw text was converted into a list of tokens by searching for the nearest (by position) match from the current search position, with matches starting at the same position being selected by match length. A built-in matcher turns currency values, such as "AUD 75" into special monetary value tokens which can be considered as Key Terms with a variable component.

The normalised text was analysed to extract desired value(s)—for example, the monetary value of the transaction (75) and the 'value' of the currency (AUD). The syntax used to extract the desired values in experiments conducted by the inventors was syntax in the proprietary RippleDown condition language using textual regular expression pattern matching algorithms. FIG. 3 shows a user interface screen displaying two examples of comments with embedded variables that were used to extract currencies and values from normalised text.

The TNA was trialled by building a knowledge base in which the comments were variable expressions that gave the cost of re-issuing an airline ticket for a given reason. In almost every case, the condition for adding a comment such as:

Amount={amount in codes matching "CX BT FOR MV$"} in NormCat Currency={currency in codes matching "CX BT FOR MV$" in NormCat} was

NormCat contains code sequence "CX BT FOR MV$"

In essence, the same matching sequence had to be written three times: twice in the variable comment and once in the condition to add it.

Using this text normalisation process, we could build a knowledge base that successfully analysed most of the faresheets we saw from one country, say Australia, though some enhancements would have been necessary to extract data from the most complex faresheets. However, there were problems that would have meant that the knowledge base was hard to maintain, especially when we needed to add new Keywords or Key Terms for the faresheets from another country. An analogous problem could arise in other contexts—for example, if clinical notes from more than one clinician need to be included in the interpretation of a patient's test results.

The problems with TNAs can be described as follows:

A. Sensitivity to Changes in the Information Extracted

Adding new Keywords to a TNA could result in the variables in comments and the conditions in rules no longer evaluating as intended. For example, suppose a faresheet contained the text:

... BEFORE DEPARTURE BUT WITHIN 24 HOURS OF SCHEDULED FLIGHT TIME CHARGE AUD 75 FOR CANCELLATION ...

This text contains key words "BEFORE DEPARTURE", 'CANCELLATION" and "FOR". These key words are synonyms (variants or regular alternative expressions) to the Key Terms listed in FIG. 2. The TNA maps the regular expression to the relevant key word.

If the TNA replaced "BEFORE DEPARTURE" by "BT", "FOR" by "FOR" and "CANCELLATION" by "CX", plus the built-in match of monetary values, the normalised text (i.e. the output of the Derived Attribute, which is a string of condensed text) would have been:

BT MV<AUD,75> FOR CX

This normalised text satisfies the condition:

contains code sequence "BT MV$ FOR CX"

If we now decide that the phrase "WITHIN 24 HOURS OF SCHEDULED FLIGHT TIME" is important and needs to be captured, we must add a new key word, e.g. "W24HFT" for this. Our normalised text now becomes:

BT W24HFT MV<AUD,75> FOR CX

However, the new normalized text no longer satisfies the original condition because of the presence of the "W24HFT" in the code sequence. That is, adding new Key Terms can easily cause the TNA to evaluate differently to what was intended.

Exactly the same problem occurs if Key Terms are removed from the text normalization process.

B. Redundancy in Comments and Conditions

As outlined in the example above, the same matching sequence had to be used three times to extract a value and currency from the normalised text. This was inefficient both in terms of processing time and time required by the user to build the comments and conditions, and would eventually have made the knowledge base harder to maintain than it needed to be.

C. Sensitivity to Keyword Renaming

If we decided to change a Keyword, say from "BT" to "Before Travel", then the variables and conditions that used this Keyword would again no longer apply. This is similar to problem A, though more easily avoided, since renaming Keywords is a cosmetic change, whereas adding new Keywords or removing existing Keywords is a more fundamental change to the text normalisation process.

Thus previous attempts to resolve the problem of pre-processing data in freeform text suffered disadvantages in being unable to cope with changed Keywords and inefficiency in the definitions of comments and conditions. This limitation was observed in attempting to address the problem in the context of both the airline ticketing example and log file example outlined above.

Taking now the IT support services example, consider the following log file fragment:

---

2010-08-18 02:00:00:437 INFO Preventative Maintenance started.
Version: 5.78 den 1 april 2010. Update on: den 1 oktober 2011
2010-08-18 02:00:01:218 INFO Beginning backup of all, with 2 threads
2010-08-18 02:00:01:453 WARNING Could not disconnect client:
Proxy [ooOO,RemoteObjectInvocationHandler[UnicastRef [liveRef:
[endpoint:[10.100.99.14:4269](remote),objID:[−7fa760b7:12a80222289:−7ffe,−4425482139264106608]]]]]
2010-08-18 02:00:01:906 INFO RDRServerImpl. Used memory: 66

---

A text normalisation process using a TNA could filter and reduce these log entries to the following:

PM DC where the first log entry has been coded as 'PM', the third as 'DC' (WARNING Could not disconnect client), and the second and fourth (informational) entries have been ignored.

A rule indicating a false positive (i.e. not significant) DC alert may use the condition contains code sequence "PM DC"

However, if the TNA is now modified to include new terms, such as the backup (BCK) events, the resulting normalised text would become:

PM BCK DC

And the condition indicating that the DC alert was a false positive would no longer evaluate correctly.

Thus the same limitations of TNAs described in the previous airline ticketing example also apply here.

The embodiment of FIG. 9 provides a new tool (known as a "Text Condenser Attribute", or TCA)) incorporating both Key Terms and Key Concepts. By putting both Key Terms and Key Concepts into a single tool, the problems caused by adding or removing Keywords is overcome. Also, because Keywords are shared objects in both the terms and concepts, Keywords can be renamed without affecting the rules applied to aggregate data items (e.g. in step 702 of FIG. 7). Further, the tool includes an extraction of Key Concepts as Derived Attributes themselves, so there is less need for replication in conditions and variables.

Figures 10, 11:
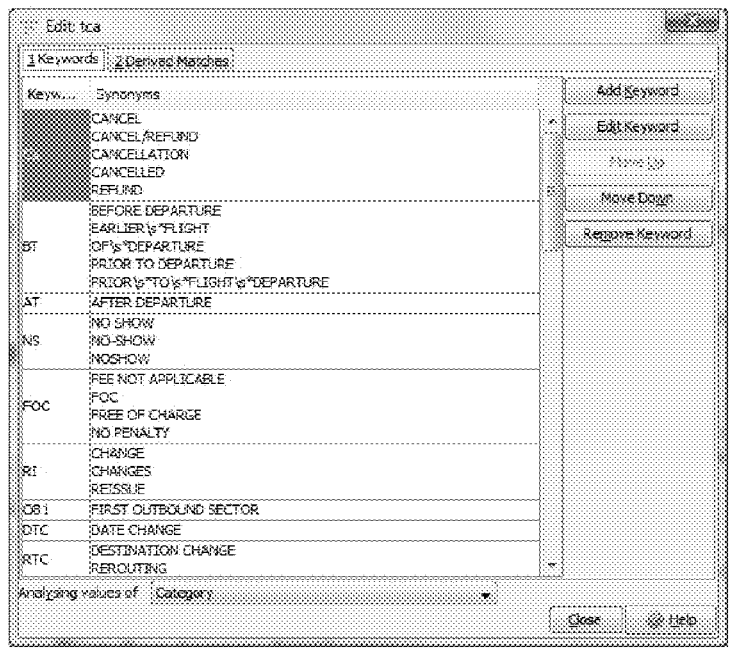
FIG. 10 is a window of a user interface showing an example of a text condenser Attribute (TCA), which defines Key Terms, according to an embodiment. The example shown relates to airline ticketing.
FIG. 11 is a window of a user interface showing an example of a text condenser Attribute (TCA) according to the embodiment in FIG. 10, in which Key Concepts are also defined along with Key Terms. The example shown relates to airline ticketing.

FIG. 10 shows an exemplary user interface of a TCA. An "Attribute" or "Primary Attribute" is one of the basic elements of a rule condition or other expression. Each Attribute has a name and an associated value, or possibly sequence of values e.g. if a time-series of values is associated with that Attribute. An Attribute represents a data value element of a rule condition e.g. a low level data item like a single allergen marker, or a higher-level aggregate data item like a pollen item. The other elements of a rule condition are arithmetic, textual, logical operators or other expressions that relate Attributes and their values in order to form a Boolean expression. For example the rule condition "some pollen are high" contains the Attribute "pollen" (an aggregate data item) and a logical expression "some X are high" where the value of pollen is substituted for the variable "X".

A "case" is the collection of Attributes and their values presented to the expert system for interpretation. The preprocessor will take a complex case, i.e. a case with a large number of Attributes, or Attributes with large amounts of freeform textual data, or Attributes with long sequences of data items, and reduce the complexity of that case by adding aggregate data items (higher-level or "derived" Attributes) to the case which can be more easily and more generally used in rule conditions and in the interpretive report.

A text condenser Attribute (TCA) is such a Derived Attribute. It defines a set of Keywords (or 'Key Terms'), along with a set of Key Concepts or 'Derived Matches' (see FIG. 11). Each Key Concept or Derived Match consists of:
(a) a target, which is in fact another Derived Attribute in the knowledge base or expert system;
(b) an extraction formula, which defines values of the Derived Attribute in terms of the matched form; and
(c) a list of 'Matching Forms', which are sequences of Key Terms.

The embodiment performs an evaluation of a TCA on a block of text as follows:
(a) the text is normalised into a sequence of Keywords;
(b) the normalised text is analysed by each of the Derived Matches, providing the values for the Key Concepts. For each Derived Match, the longest of its Matching Forms that matches (if any) is taken. This is known in the literature as a "greedy" pattern match;
(c) for each Derived Match for which a Matching Form finds a match, a predefined formula for the relevant Derived Match is applied, and this becomes the Attribute value for the derived Attribute corresponding to that Key Concept Considering the example of analysing airline faresheets in which all of the relevant formulas are "$(1)". This is interpreted by the system 1, 3 (see FIGS. 4 and 6) as 'return the first monetary value token that is found in the matched text'. We will look at other extraction formulas later.

Figures 12, 13:
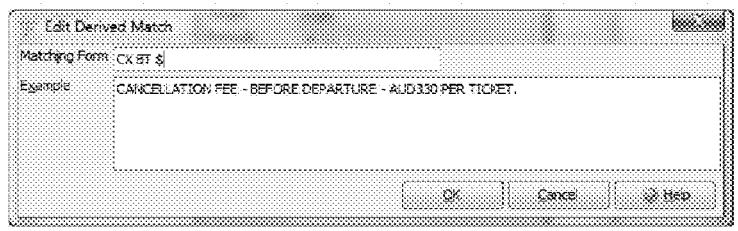
FIG. 12 is a window of the user interface of the text condenser Attribute (TCA) of FIG. 10 putting a value for itself ('TCA') and for the Key Concepts 'CxBt', 'CxAt', 'RiOb1' and 'RiRtc' into the sample case. The example relates to airline ticketing.
FIG. 13 is a window of the user interface of the TCA of FIG. 10 showing an example of a Matching Form defining the evaluation of a Key Concept. A user is prompted to provide an example of raw text for each Matching Form. The example shown relates to airline ticketing.

The process above can be applied across all of the samples in the Sample Sequence for the referred Attribute in a case (e.g. "Category" in the re-issuance of tickets example above). A "Sample Sequence" is an ordered, timed list of values for any Attribute. Each value in the Sample Sequence is associated with a date and a time. In this way, the TCA produces a Sample Sequence for the TCA and also for each of the associated Derived Attributes. Those that contain at least one non-blank value are injected into a case. FIG. 12 shows an exemplary case with a value for the Attribute 'Category', then a value for the TCA called 'TCA', and values for the Derived Attributes "CxBt', 'Cxt', 'RiOb1' and 'RiRtc'.

Using TCAs overcomes the problems of using TNAs described earlier by:
(a) allowing Keywords to be added and removed safely;
(b) reducing redundancy in comments and conditions; and
(c) allowing Keywords to be renamed.

A. Keywords can be Safely Added and Removed

In defining the Matching Forms in the Derived Matches (i.e. Key Concepts), the user is prompted to provide an example of raw text to be matched so that each Matching Form is accompanied by some example raw text (see FIG. 13). The user-provided example must provide a match to the Matching Form. If the user makes changes to the Keywords, such that the normalised example no longer matches the Matching Form (e.g. by adding a Keyword), the user is alerted to this (e.g. by the Derived Match being shown in a different colour or by some other means of alerting the user).

Figures 14, 15:
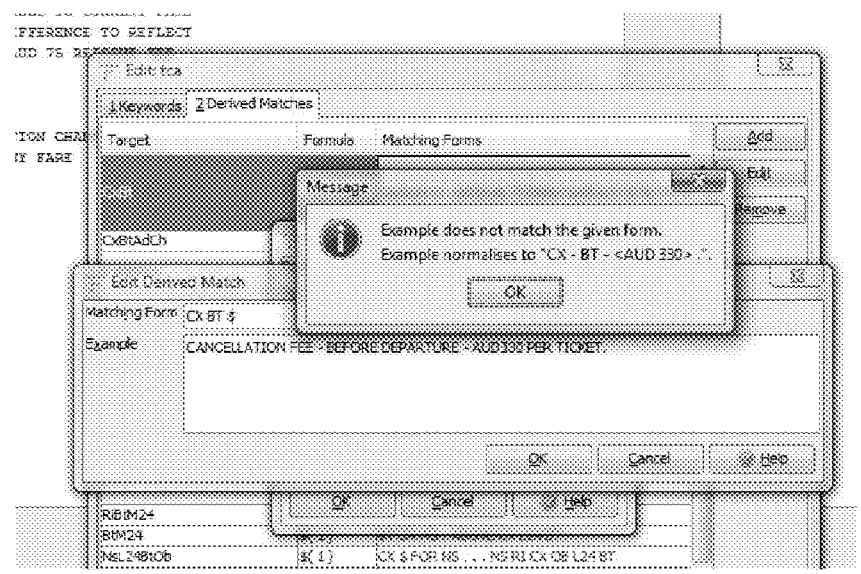
FIG. 14 is a window of a user interface of the TCA of FIG. 10 showing an example of Matching Forms for a Derived Match. The Matching Forms no longer match their examples, due to the addition of a Keyword. The example shown relates to airline ticketing.
FIG. 15 is a window of a user interface of the TCA of FIG. 10 demonstrating how Matching Forms need to be changed when a new Keyword is added, so that they match the normalised version of their examples. The example shown relates to airline ticketing.

For example, if Keyword '-' with matching phrase '-' is added to the set of Keywords, the Derived Matches are compromised, as shown in FIG. 15. To fix the Derived Matches, either the new Keyword needs to be removed or some of the Matching Forms need to be changed to match the normalised version of their examples.

In this way, the examples in the Derived Matches are like cornerstone cases in a Rippledown Knowledge Base in the sense that they provide the context for the definition of that Key Concept B. Less Redundancy in Comments and Conditions The Derived Attributes of a TCA can be used directly in variables in comments and in conditions. The conditions just assert the existence of the Derived Attribute in the case, for example:
CxBt is available
could be used to add the comment shown in FIG. 16.

C. Keywords can be Renamed

Figures 16, 17:
FIG. 16 is a window of a user interface of the TCA of FIG. 10 demonstrating how Key Concepts can be used directly in variables in comments. The example shown relates to airline ticketing.
FIG. 17 is a window of a user interface of the TCA of FIG. 10 demonstrating how changing the name of a Keyword from "BT" to "BeforeTravel" automatically updates the Matching Forms. The example shown relates to airline ticketing.

By including the Derived Matches together with the Keywords in the TCA, the system is immune to changes in the names of Keywords, as these are simply object references shared by the Keywords and the Matching Forms in the Derived Matches. So, for example, if we rename the Keyword 'BT' to 'BeforeTravel', our Matching Forms update automatically, as shown in FIG. 17.

Other Advantages of TCAs

Different Extraction Formulas

The illustrated examples of Derived Matches show the extraction of monetary values from the normalised text of a faresheet. There may be other additional kinds of information that we need to extract from freeform text such as faresheets. Examples (in the airline ticketing scenario) include:
(a) whether a key phrase occurs; and/or
(b) dates.

Figures 18, 19, 20:
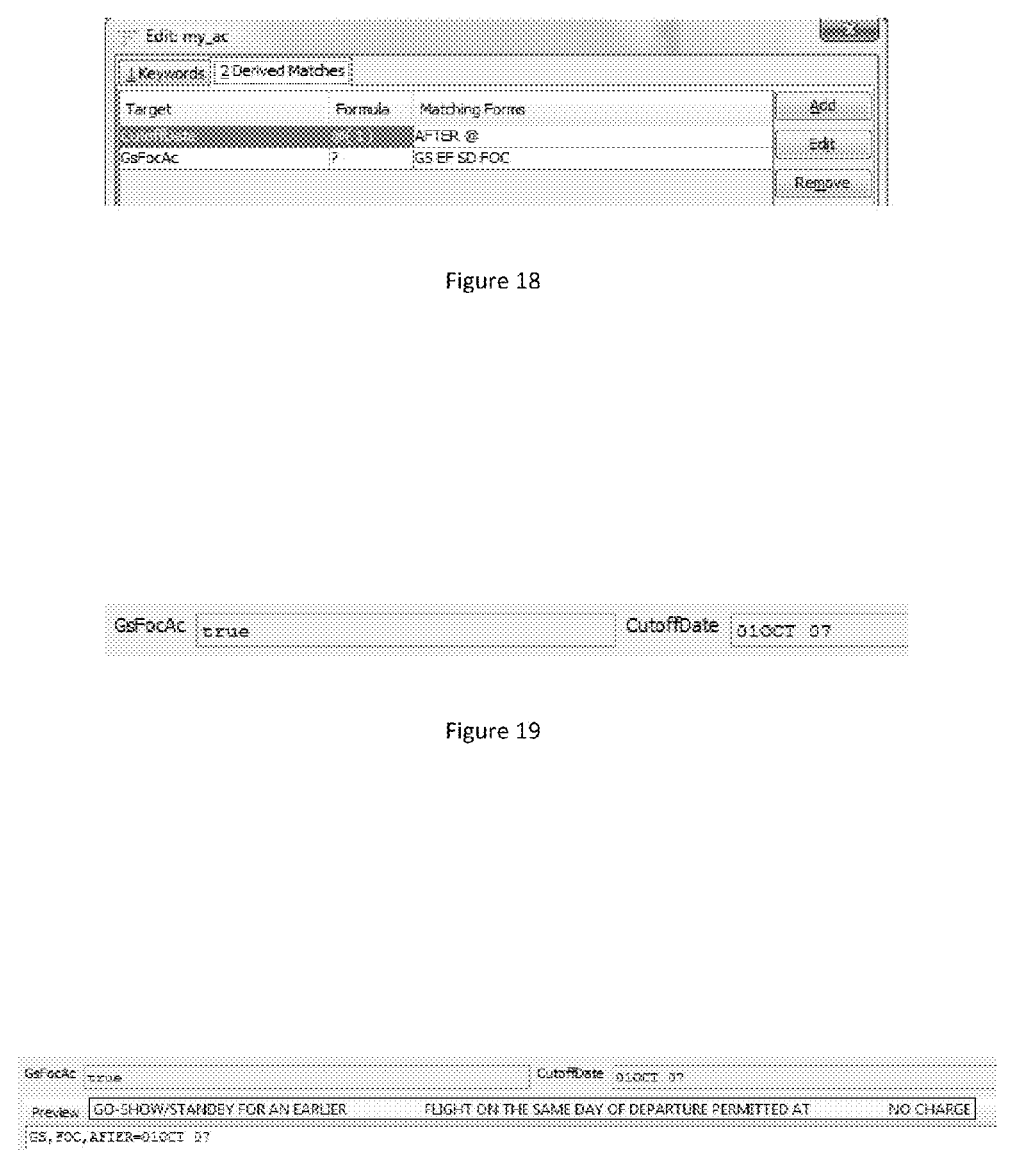

Continuing the airline ticketing example, if a Matching Form contains one or more dates (these appear as Keywords automatically, like monetary values) then we can extract the i'th date using the formula '@(i)'. To handle key phrases, we use the formula '?' to indicate that if there is a match, the Derived Attribute should get the value 'true'. An example of a TCA that makes use of both of these formulas (I.e. extracts dates and Boolean values) is demonstrated in FIG. 18. FIG. 19 illustrates how these Boolean and date values for Derived Attributes appear in this exemplary case.

Tooltips

If a user sees a Derived Attribute and its value in the case, they might be unsure as to why it is there. That is, which part of the raw text it represents. To assist in this regard, in an embodiment, we provide the raw text that gave rise to a Derived Attribute and its matched value as a tooltip (as exemplified in FIG. 20).

In a lengthy report consisting of several report sections (each with an optional heading), the order in which these report sections is presented is an important factor for the end user (e.g. a physician, an airline auditing issued tickets, real estate professional or buyer/seller). That is, the end user wants to see the most important report sections near the top of the report. However, what makes one report section more important than another depends on the particular case that is being interpreted. It is therefore advantageous to order specified report sections using rules that operate on the data in each case. The placement of some other report sections must be fixed, for example a summary report section that is always at the top of the report. Hence the user may be able to define a mixture of both fixed and variable report section orderings.

Allergy reporting is a domain where variable report section ordering may be required. There will be at least five separate report sections—corresponding to the comments on the pollen, food, mite, mould and animal allergen test results. If the food allergy test results are the most significant for a given patient, then the food report section should come before the other four, and so on. The report section corresponding to the least significant test results should be positioned after the others. Furthermore, there are fixed report sections, namely the summary report section which is at the top of the report, and a recommendations report section which is typically at the bottom of the report.

Consequently, the system provides means for the operator 38 to define a "Derived Attribute" for each variable report section, using the rules syntax, which assigns a value corresponding to the desired report section ordering. In the allergy example above, there would be five Derived Attributes, say "pollen_order", "food_order", "mite_order", "mould_order" and "animal_order". Pollen_order would be defined as the highest value of any pollen data item, and similarly for the others. The Derived Attribute "pollen_order" is associated with the pollen report section. For each case, the values of the five Derived Attributes will be calculated, and the corresponding report sections will be ordered according to these values. For example, if the case had data items and values:
  Grass=50, birch=20, (pollen)
  wheat=5, soya=15, (food)
  mould=2
  mite=1
  cat=62, dog=49 (animal)
then the report sections would be in the following order:
  Animal, pollen, food, mould, mite.

In some embodiments, the system may provide at least one of the following:
  A RippleDown rule system as the underlying technology to manage the very large knowledge bases required;
  facilities to generate coded information that are machine instructions, such as to control a workflow engine which for example controls laboratory workflow such as autovalidation and reflexive testing, using coded outputs from the knowledge base;
  natural language syntax for building rule conditions; and/or
  insertion of variables into comments that are evaluated by the specific case that is interpreted. Variables may be defined using aggregate data items.

Inferencing

Like a human expert, an expert system needs complex data to be reduced to a form where rules can be applied to data with rule applicable features, rather than the large set of data where rules may or may not apply. Therefore, a rule-based system requires a program to select the relevant rules. For example, to determine which rules have conditions that match the attributes of the case(s) presented.

An inference engine is such program which applies appropriate rules to the cases, and therefore, performs the task of inferencing an outcome, such as a "judgement" using the rules.

This inferencing is often based on rules which in some circumstances are appropriate. However, in other circumstances the rules need to be altered. Therefore, there are continual iterations of a knowledge base's rules. The applicability of one or more rules to the cases presented for interpretation determines the accuracy of the resultant interpretations.

The review and possible correction of the interpretations generated by a knowledge base determines a set of "rejected" cases. These are presented to an expert maintaining the knowledge base who accepts the original interpretation, or else or creates a new rule so that the corrected interpretation is given by the knowledge base for subsequent cases.

Similarly to a human expert, a rules-based expert system needs to have the data presented to it in terms of the relevant significant features so that it is enabled to inference from these features. If it were to inference from the complex raw data, the number of specific rules required would not only be unmanageable, but once built it would fail to interpret any newly encountered variations in the complex data presented. Inferencing from more generalised features in the data makes the interpretation process itself more generally applicable and so more robust.

In a high transaction environment, expert systems are enabled to perform an essential role in leveraging human expertise to provide rapid interpretations of raw data. For example, a pathology laboratory may need to provide interpretive reports for tens of thousands of patients per day, far beyond the manual capability of the few pathologists who might be employed at that laboratory.

Multi-Level Inferencing

Multi-level inferencing is the process of creating successively higher levels of abstraction (termed high level concepts) in the interpretation process.

Higher Level Abstractions

Intermediate conclusions are used to provide higher level abstractions used by other rules later in the inferencing process. They themselves do not appear in the final interpretation, but will influence the rules used to determine the final interpretation.

In the preferred embodiment, there are two stages of multi-level inferencing at the:
  1. attribute level; and
  2. rule level.

Multi-Level Inferencing at the Attribute Level

Attributes may be defined in terms of other attributes according to some formula or expression, e.g. an arithmetic formula, a Boolean expression or a set membership operation.

These are called "derived" attributes, in contrast to "primary" attributes which are those that are received from the Online Information System.

For example, the task of the knowledge base is to flag any suspicious transactions to a human expert for further review, but not to flag transactions which aren't suspicious as these waste the time of the human expert.

Examples of transactions parsed via the knowledge base include the following three transactions:

| Date | 1 Dec. 10 | 2 Dec. 10 | 3 Dec. 10 |
| --- | --- | --- | --- |
| Company | Baxxon | Baxxon | Baxxon |
| Country | Uginta | Tigeria | Uginta |
| Amount | $9,999 | $9,950 | $9,967 |
| Prev. flagged | No | No | |

The primary attributes in these financial transactions in a case may consist of "company", "country", "amount" and "previously flagged".

Derived attributes are defined as abstractions to make consequent rules more general and more maintainable. For example the following derived attribute are defined:
  1. "oil industry" which is true if a transaction involves a company in the oil industry. Baxxon is one of the set of oil companies.
  2. "non-treaty country" which is true if a transaction pertains to a certain set of countries who may not be party to certain international treaties. Uginta and Tigeria are included in this set.

3. "borderline amount" which is true if a transaction value is close to the minimum value such that the transaction would automatically come under scrutiny. For this example, an amount between $9,500 and $9,999 is considered borderline.
4. "previous borderline amounts" which is the count of the number of transactions that were borderline within the past week.

Once these derived attributes are evaluated by the multi-level inferencing process, the case becomes:

| Primary Attributes | | | |
|---|---|---|---|
| Date | 1 Dec. 10 | 2 Dec. 10 | 3 Dec. 10 |
| Company | Baxxon | Baxxon | Baxxon |
| Country | Uginta | Tigeria | Uginta |
| Amount | $9,999 | $9,950 | $9,967 |
| Derived Attributes | | | |
| Prev. flagged | No | No | No |
| Oil industry | Yes | Yes | Yes |
| Non-treaty country | Yes | Yes | Yes |
| Borderline amount | Yes | Yes | Yes |
| Prev. borderline amounts | 0 | 1 | 2 |

This multi-level inferencing in this example requires two inferencing parses to define all the attributes:
1. the first parse enables the attributes "oil industry", "non-treaty country" and "borderline amount" to be determined; followed by
2. the second parse enables the attribute of "previous borderline amounts" to be calculated.

Other examples of multi-level inferencing are provided by the applicant and inventors in Australian patent application no. 2010904545 (which is incorporated by reference herein).

A derived attribute using the application of multi-level inferencing at the attribute level is specified in terms of a single formula or expression and so its definition is limited to those that can be derived from the primary attributes alone.

Multi-Level Inferencing at the Rule Level

A higher level of abstraction is enabled by:
1. derived attributes as extracted from primary attributes (as shown above); and
2. conclusions of the knowledge base, as extracted via the rule base.

At the first level of rule based inferencing, a conclusion is given by one or more rules which are defined in terms of attributes (either primary or derived attributes or both).

At the second level, a conclusion may be given using rules which involve first level conclusions in the rule conditions.

This multi-level inferencing at the rule level may then be applied to a third and additional levels as required.

In the financial example above, the user may define a first level conclusion as a "suspicious transaction" using the rule conditions IF:
"Borderline amount" is true, and
"non-treaty country" is true, and
"at least 2 previous borderline amounts"
all of which are true for this case.

The reason why "suspicious transaction" is defined as a conclusion and not just another derived attribute is because this "suspicious transaction" is a more complex concept than can be defined with a single formula or expression.

For example, there may be many quite different scenarios which would indicate a "suspicious transaction". Each scenario would be specified by a different set of rule conditions, any of which would give the conclusion "suspicious transaction".

Conversely, there may be a case which seems to be very similar to a "suspicious transaction" scenario, but there may be a minor difference in the case which would make it not suspicious.

The user may now define a 2nd level conclusion "review required" using the rule conditions:
"suspicious transaction", and
"not previously flagged".

Again, both of these conditions are true for this case. The condition "not previously flagged" is included to avoid flagging transactions that have already be flagged, and so to avoid re-reviewing a transaction, again with the aim of not wasting the time of the human expert.

The user may also define a 3rd level conclusion called "Explanation" with the value: "This transaction of <amount> is suspicious because there have <previous borderline amounts> previous borderline transactions in the last week from the company <company> and the current transaction is from the non-treaty country <country>. The rule condition giving this conclusion is simply "review required".

The purpose of this conclusion is to provide a textual explanation to the human reviewer as to why this case was flagged by the knowledge base for their review. The variables in the comment (indicated by the < > symbols) will be evaluated from the particular attribute values in the case.

The user may also define a 3rd level conclusion called "Queue" with the value: "Oil transactions" using the rule conditions:
"review required", and
"Oil company"

The purpose of this conclusion is to send the case to a specific queue that is reviewed by an expert who has experience in a particular type of transaction, in this case, transactions by an oil company.

Once these conclusions are evaluated by the multi-level inferencing process, the case and its rule-based interpretation becomes:

| | | | |
|---|---|---|---|
| Date | 1 Dec. 10 | 2 Dec. 10 | 3 Dec. 10 |
| Company | Baxxon | Baxxon | Baxxon |
| Country | Uginta | Tigeria | Uginta |
| Amount | $9,999 | $9,950 | $9,967 |
| Previously flagged | No | No | No |
| Derived Attributes | via multi-level inferencing at the attribute level | | |
| Oil industry | Yes | Yes | Yes |
| Non-treaty country | Yes | Yes | Yes |
| Borderline amount | Yes | Yes | Yes |
| Prev. borderline amounts | 0 | 1 | 2 |
| Interpretation | via multi-level inferencing at the rule level | | |
| Suspicious transaction | True | | |
| Review required | True | | |
| Comment | This transaction of $9,967 is suspicious because there have 2 previous borderline transactions in the last week from the company Baxxon and the current transaction is from the non-treaty country Uginta | | |
| Queue | Oil Transactions | | |

Three inferencing passes are needed to define all these conclusions, once all the attributes have been defined.

On the 1st pass the conclusion "suspicious transaction" is given. On the 2nd pass "review required" is given. On the 3rd pass "queue" and "explanation" are given.

The application of multi-level inferencing at the rule level to the knowledge base utilising a RippleDown Rules methodology enables the definition of such a concept as "suspicious transaction" as a conclusion, taking into account all scenarios which indicate a suspicious transaction, yet excluding all scenarios that do not. This provides a broader scope than provided by one or more derived attribute using multi-level inferencing alone.

Multi-level inferencing allows a knowledge base to be defined using concepts that are at the appropriate level of abstraction for that expert domain.

At the attribute level, multi-level inferencing allows a more or less arbitrary set of primary attributes received from an online information system to be pre-processed into derived attributes that represent concepts that are specific to and appropriate for the domain.

Pre-processing at the attribute level can also reduce data complexity by extracting concepts from large blocks of free text, for example, or by filtering and grouping large numbers of related attributes into higher level attributes.

At the conclusion level, multi-level inferencing allows high-level abstractions to be defined that represent the concepts a human expert would normally use in understanding this domain and in justifying their interpretations of specific scenarios.

The use of the RippleDown methodology to define conclusions means that these high-level abstractions can be refined over time to provide not just natural representations of possibly quite complex concepts, but highly accurate and unambiguous representations.

With a collection of appropriate abstractions of the case that are specific to the domain, coupled with RippleDown's inbuilt cornerstone case verification procedures (described elsewhere), the expert's task of building and maintaining a large, sophisticated and useful knowledge base in terms of these abstractions becomes achievable.

EXAMPLE 1

A first example application is a leukaemia report knowledge base where diagnosis is performed using hundreds of tests whose values are determined by a micro array of hundreds of protein expression or gene expression markers. An expert may build a diagnosis and report knowledge base that identifies the subsets of relevant markers, the diagnosis corresponding to this pattern, and comments for those significant subsets in a textual report to the referring medical practitioner.

The array test results are provided as inputs to the knowledge base as a plurality of data items and value pairs. The data items are, in this example, labelled CD1 to CD100 to identify them, indicating 100 elements to the array. Real-world examples may contain several hundreds of markers.

In this example, a value for one of the data values of less than 50 means that there is no expression of the antibody corresponding to that marker for that patient sample. A value greater than 50 is possibly significant (depending on the values of other markers). A value higher than 100 for a marker indicates a significant expression.

The diagnosis of a particular variety of leukaemia can be deduced from the values of specified sub-sets of the 100 data values.

For example, a diagnosis of B-cell Chronic Lymphocytic Leukaemia (B-CLL) can be deduced from the significant expression of at least 2 of CD1, CD2, CD3, CD4 and CD5. This diagnosis is supported by the significant expression of any of CD6, CD7, CD8, CD9 and CD10 although these are not diagnostic of BCLL in themselves.

Alternatively, a diagnosis of Acute Myeloid Leukaemia (AML) can be deduced from the significant expression of at least 2 of CD11, CD12, CD13, CD14 and CD15. This diagnosis is supported by the significant expression of any of CD16, CD17, CD18, CD19 and CD20 although these are not diagnostic of AML in themselves.

Figure 21:
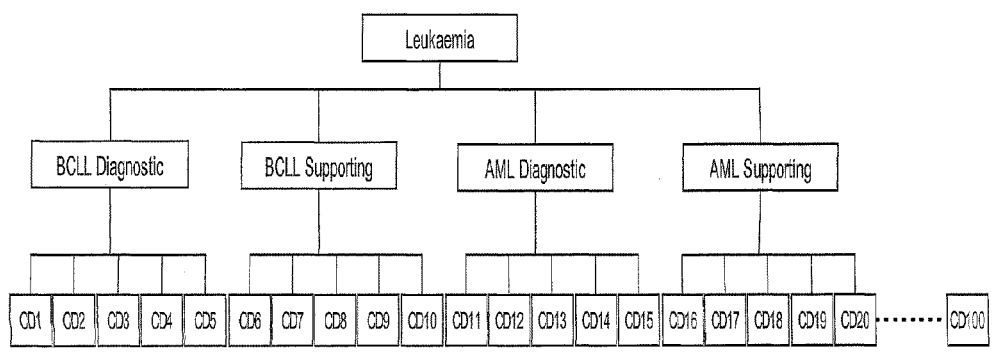
FIG. 21 is a schematic representation of one embodiment of a hierarchial relationship for data items and aggregate data items.

Five aggregate data items are populated with received data items as specified by an example structure:
 1. "BCLL Diagnostic" populated by the data items CD1, CD2, CD3, CD4, CD5
 2. "BCLL Supporting" populated by the data items CD6, CD7, CD8, CD9, CD10
 3. "AML Diagnostic" populated by the data items CD11, CD12, CD1, CD14, CD15
 4. "AML Supporting" populated by the data items CD16, CD17, CD18, CD19, CD20
 5. "Leukaemia" populated by the aggregate data items BCLL Diagnostic, AML Diagnostic, BCLL Supporting, AML Supporting A schematic of one embodiment of a structure giving the hierarchical relationship for these data items and 15 aggregate data items is shown in FIG. 21. In some embodiments, once the lower levels of the structure are populated, the value or characteristics at the upper levels are calculated. The structure may be stored in the memory 20 or hard drive 2 (or other data storage unit) of the device 1, for example, and interpreted by the CPU 4.

The following ranges may also be defined:
 (a) "Undetected" defined as the constant 50; and
 (b) "High" defined as the constant 100.

To represent the significant data items in each set, further aggregate data items are populated by applying the following rules:
 1. "Significant BCLL Diagnostic" populated by the rule "BCCL Diagnostic in range [>High]"
 2. "Significant BCLL Supporting" populated by the rule "BCCL Diagnostic in range [>Undetected]"
 3. "Significant AML Diagnostic" populated by the rule "AML Diagnostic in range [>High]"
 4. "Significant AML Supporting" populated by the rule "AML Diagnostic in range [>Undetected]".

A BCLL diagnostic comment is given by the following pseudo text:
"Pan-B cell antigen expression with <Significant BCLL Diagnostic>, co-expressed with <Significant BCLL Supporting>, typical of B-Cell Chronic Lymphocytic Leukaemia (B-CLL)."

The variable "<Significant BCLL Diagnostic>" is an instruction to list the names and values of the significant BCLL data items, and similarly for the variable <Significant BCLL Supporting>. In this embodiment, the listed names and values are ordered in terms of decreasing data item value so that the most significant Attributes are listed first.

A BCLL diagnostic rule triggers the generation of the BCLL diagnostic comment as follows:
"number of Significant BCLL Diagnostic >=2", and
"number of Significant BCLL Supporting >=1"

That is, the comment is generated if there are 2 or more data items in the set Significant BCLL Diagnostic, and 1 or more data items in the set Significant BCLL Supporting.

As a second comment example, the AML diagnostic comment is given by the following pseudo text:
"Consistent with AML antigen expression based on positive <Significant AML Diagnostic as names>, coexpressed with <Significant AML Supporting as names>. Query possible M2 classification."

The data item "<Significant AML Diagnostic as names>" is an instruction to the knowledge base to list just the names of the significant AML data items, and similarly for the variable <Significant AML Supporting as names>.

In this embodiment, the listed names and values are ordered in terms of decreasing data item value so that the most significant data items are listed first, even though the values will not be shown for this comment.

The AML diagnostic rule triggering the generation of the AML comment may be:
"number of Significant AML Diagnostic >=2", and
"number of Significant AML Supporting >=1"

The comment is given if there are 2 or more data items in the set Significant AML Diagnostic. This in turn means that there are 2 or more data items in the set AML Diagnostic which have values greater than 100, and at least 1 data item in the set AML Supporting which has a value greater than 50. Consider the results of the testing for a sample from patient "A" as follows:

| | |
|---|---|
| CD1 | 0 |
| CD2 | 95 |
| CD3 | 190 |
| CD4 | 150 |
| CD5 | 260 |
| CD6 | 0 |
| CD7 | 90 |
| CD8 | 60 |
| CD9 | 0 |
| CD10 | 15 |
| CD11 | 30 |
| CD12 | 60 |
| CD14 | 20 |
| CD15 | 0 |
| CD16 | 0 |
| CD17 | 0 |
| CD18 | 50 |
| CD19 | 50 |
| CD20 | 40 |
| CD26 to CD100 | 0 |

These results are sent to an embodiment of the knowledge base which evaluates the aggregate data items and evaluates expressions as follows:
Significant BCLL Diagnostic evaluates to "CD5, CD3 and CD4"
Significant BCLL Supporting evaluates to "CD7 and CD8"
Both Significant AML Diagnostic and Significant AML Supporting evaluate to null.

The knowledge base then makes an interpretation according to the rules defined above. The BCLL rule is applicable in this case as there are 3 elements in the Significant BCLL Diagnostic set, and 2 elements in the Significant BCLL Supporting set.

The knowledge base evaluates the variables in the BCLL comment "<Significant BCLL Diagnostic>" and "<Significant BCLL Supporting>" then gives the evaluated comment:
"Pan-B cell antigen expression with CD5 (260), CD3 (190) and CD4 (150), co-expressed with CD7 (90) and CD8 (60), typical of B-Cell Chronic Lymphocytic Leukaemia (B-CLL)."

For a second example, consider the test results for patient "B" as follows:

| | |
|---|---|
| CD1 | 0 |
| CD2 | 5 |
| CD3 | 30 |
| CD4 | 40 |
| CD5 | 60 |
| CD6 | 0 |
| CD7 | 20 |
| CD8 | 40 |
| CD9 | 0 |
| CD10 | 15 |
| CD11 | 130 |
| CD12 | 160 |
| CD14 | 20 |
| CD15 | 0 |
| CD16 | 0 |
| CD17 | 0 |
| CD18 | 55 |
| CD19 | 100 |
| CD20 | 60 |
| CD26 to CD100 | 0 |

These results are sent to the knowledge base which firstly evaluates the aggregate data items as follows:
Both Significant BCLL Diagnostic and Significant BCLL Supporting evaluate to null
Significant AML Diagnostic evaluates to "CD12 and CD11"
Significant AML Supporting evaluates to "CD19, CD20 and CD18"

The knowledge base then makes an interpretation according to the rules above. The AML rule is applicable in this case as there are 2 elements in the Significant AML Diagnostic set, and 3 elements in the Significant AML Supporting set.

The knowledge base then gives the comment:
"Consistent with AML antigen expression based on positive CD12 and CD11, co-expressed with CD19, CD20 and CD18. Query possible M2 classification."

EXAMPLE 2

Another example application is an allergy report knowledge base where there are potentially 500 or more IgE tests that can be performed. The task of the allergy expert is to advise the referring doctor which subset of the tests performed have significant result values for the patient, which test values may not be significant, which tests need to be followed up, including which of the 500 possible tests, should be also be performed as follow up.

One example solution:
From the total collection of possible data item names, to group those data item names into aggregate data items based on domain-specific rules, e.g. significant pollen Attributes, and case-specific rules.
To use any of the characteristics of an aggregate data item as the basis for further rules and/or comments. For example, give a particular comment if the number of elements of an aggregate data item is above a certain number, or if the set includes a particular element.
To use one or more aggregate data item as variables in a comment, for example, "The dog, cat and peanut allergies are significant" where the phrase "dog, cat and peanut" is an evaluation of the aggregate data item consisting of allergens that are significant for this case. The generic form of the comment may be The {SignificantAllergens} allergies are significant where the set {SignificantAllergens} is itself defined by rules.
To optionally include the values of the data item in the comment, e.g. The dog (102.3), cat (56.4) and peanut (43.5) allergies are significant.
To appropriately order the data items in an aggregate data item which appears in a comment, e.g. in terms of decreasing Attribute value in the case so that the most significant Attributes appear first in the comment.

To automatically format the data items into a naturally constructed sentence that is consistent with the rest of the report. For example if 3 Attributes are significant the format of the set may be "dog, cat and peanut allergies" whereas if only 2 Attributes are significant the format of the set may be "dog and cat allergies"

To be able to define a grouping of data items based on a previous grouping of data items, e.g. the new aggregate data item could be the difference, union, or intersection of one set from another, or any set operation. This allows the definition of a hierarchy of sets. For example the difference between the set "appropriate tests" and the set "ordered tests" could identify the set of appropriate tests which have not yet been ordered.

To be able to define a comment that uses either individual data items or an aggregate data item containing those Attributes as appropriate. For example, to use the term "food allergy" rather than "peanut, soy, milk, egg and peach allergy" if the list of individual data items would be too long for the comment for that particular case.

Similarly, to be able to define a comment that uses a super aggregate data item name rather than subset names as appropriate. E.g. to use the term "inhalant allergy" rather than "pollen, animal, mould, . . . allergies" if the list of individual aggregate data items would be too long for the comment for that particular case.

Pseudo Text

The following table defines some of the features of the pseudo text discussed above, where:

s, t, x, y, z refer to data items, either primary or derived data items.

The letters X, Y, Z refer specifically to aggregate data items (a type of derived data item).

The letters a, b refer to numbers or named constants.

The letter p refers to a Boolean expressions.

| Syntax | Definition | Examples |
|---|---|---|
| { } | {x, y, z . . . } an aggregate data item consisting of the specified data items | Aggregate data item food defined as {peanut, egg, milk} |
| in range | {x, y, z . . . } in range [a, b] an aggregate data item consisting of those specified data items where the value of that data item is in the specified range including endpoints a and b. {x, y, z . . . } in range (a, b) as above, but the values a and b are not themselves included in the range. Mixed open and closed ranges are also possible, that is {x, y, z . . . } in range (a, b] and so on | Aggregate data item HighFood defined as {peanut, egg, milk} in range [20, 50] or equivalently food in range [20, 50] where food is defined as above. |
| Number of | Number of {x, y, z} Number of X The number of data items in an aggregate data item | Number of {peanut, egg, milk} in range [20, 50] Number of HighFood |
| Is empty | X is empty True if there are no data items in an aggregate data item | HighFood is empty |
| Sum of | sum of {x, y, z . . . } sum of X The arithmetic sum of the values of the data items in an aggregate data item | sum of {peanut, egg, milk} in range [20, 50] sum of HighFood |
| Union | {s, t . . . } union {x, y . . . } X union Y This is the set union operation | Food union animal |
| in | {s, t . . . } in {x, y . . . } X in Y This is the set intersection operation | HighAllergens in food |
| Not in | {s, t . . . } not in {x, y . . . } X not in Y This is the set difference operation | HighAllergens not in food |
| Includes | X includes x True if the aggregate data item X contains the data item x | HighFood includes peanut |
| Does not include | X does not include x Negation of "includes" | HighFood does not include peanut |
| For | X for p Defines an aggregate data item X subject to a condition p | Aggregate data item AllergensForInfants defined as {peanut, egg, milk} for (age < 2) |
| As groups from | {X, Y, Z . . . } as groups from {S, T . . . } Represents data items in a comment using the specified aggregate names | {allergens} as groups from {food, pollen, mould, mite,} will appear in a comment as "food and pollen" for example, rather than as constituent data item names "peanut (20.0), egg (15.1) and grass (6.4)" |

| Syntax | Definition | Examples |
| --- | --- | --- |
| As names | {x, y, z} as names<br>X as names<br>Represents an aggregate data item in a comment without the corresponding data item values | Food as names<br>will appear in a comment as "peanut and egg" rather than "peanut (20.0) and egg (15.1)" |

EXAMPLE 3

A third example application is a knowledge base used to interpret airline ticket faresheets and determine the conditions under which a ticket may be re-issued such as:
 (a) start and destination cities; and
 (b) what penalty fees may apply.

A second knowledge base is used to interpret the re-issued tickets to determine the actual fees paid and the start and destination cities.

A third knowledge base will interpret the outputs of the other two knowledge bases and determine if the re-issued tickets complied with the conditions of their faresheets.

Considering just the first knowledge base, a fragment of the freeform text in a faresheet could be as follows:

```
PENALTIES - 16
   - NOTE - GENERAL RULE DOES NOT APPLY
      NOTE -
         CANCELLATION FEE -
         BEFORE DEPARTURE - AUD110 PER TICKET.
         AFTER DEPARTURE THE REFUND IF ANY WILL BE ASSESSED
         AT THE APPLICABLE FARE FOR THE JOURNEY TRAVELLED
         PLUS AUD 75 ADMINISTRATION FEE WILL APPLY.
         CHANGES-
         FIRST OUTBOUND SECTOR-ALL TICKETS MUST BE UPGRADED
         TO CURRENT FARE PLUS ANY SEASONAL FARE DIFFERENCE
         TO REFLECT THE CORRECT TRAVEL DATE. AUD75 PENALTY
         FEE WILL APPLY.
         ADDITIONAL FLIGHT SECTORS - TICKET RE-ISSUANCE DUE
         DATE CHANGES PERMITTED FOC.DESTINATION CHANGES
         WILL INCUR A REISSUE FEE OF AUD75 PLUS ANY FARE
      DIFFERENCE.
```

A Text Condenser Attribute (TCA) is used to pre-process this faresheet fragment. Some Keywords in the TCA are:
 (a) "CX" referring to "CANCELLATION FEE" and other similar phrases;
 (b) "BT" referring to "BEFORE DEPARTURE" and other similar phrases; and
 (c) "<AUD n>" referring to monetary values with variable amounts like "AUD110" OR "AU D75".

A Key Concept in the TCA is the Derived Attribute "CancellationFeeBeforeTravel" which is defined as having the variable monetary value N derived from the sequence of key words "CX BT <AUD N>". In this example, the Attribute "CancellationFeeBeforeTravel" has numeric value 110.

The knowledge base has a rule to output this and other faresheet conditions as a conclusion in a standardised form, e.g. "CancellationFeeBeforeTravel=110". These standardised forms will be inputs to the third knowledge base which compares the faresheet conditions with the outputs of the second knowledge base summarising the actual journey and fees paid for the re-issued ticket. The third knowledge base will then interpret the faresheet conditions and the summarised details of the re-issued ticket to make the judgement whether the re-issued ticket was re-issued in accordance with the faresheet conditions.

EXAMPLE 4

A fourth example application is a knowledge base used to monitor a sequence of log file entries and determine when and if alerts should be sent to IT support staff.

An expert system can play an essential role in assisting the IT support staff to monitor and interpret a log file. The expert system can help distil out from this very large freeform text data those specific alerts, warning or trends which they regard as being significant and which would indicate that some preventative or remedial action is warranted by the IT support staff.

A more specific difficulty in interpreting a log file is the problem of "false positives", that is, alerts which are not in fact significant, or which are less significant than others.

For example, a first "low memory" alert may be significant, but a subsequent repeat of that alert may simply be an indication of the already alerted problem (a "false positive"), or else it may in fact be an entirely new problem (a "true positive"). If there is a long time difference between these two alerts, then the second alert is more likely to be a true positive.

Another example is an instance of a "disk thrashing" alert due to a high rate of page faults. This is significant, but possibly only a symptom of a more important problem which may be a low memory condition. In this case, the existence of a "low memory" alert before the "disk thrashing" alert would mean that the second alert is less significant than if there were no previous "low memory" alert.

Another example is an instance of "failed client disconnection" alert. At most times of the day this would be a significant alert which would warrant immediate investigation by IT support staff. However, if the alert was logged at a specific time of the day, say 2 am when the system was known to be offline due to its daily preventative maintenance (PM), the alert may not be significant.

The rules determining the significance of an alert and therefore the appropriate response must take into account not just the types of alerts, but their sequence, their frequency, their timing relative to each other, and even their absolute time stamps.

Once the significance of an alert is determined, the decision can be made by the expert system regarding the appropriate action to take. Therefore, for an expert system to interpret a log file, it needs to be pre-processed so that individual log entries or sequences of log entries are classified into sequences of Key Terms or Key Concepts. The complex and essentially freeform text log file is therefore reduced to a normalised form from which simpler, higher-level, atomic data items can be extracted and used in rule conditions.

An example potential alert situation is indicated if a log entry indicates that a user (client) is unable to be disconnected. However, if this warning occurs after the system has commenced its preventative maintenance, then the potential alert is considered as a false positive and no alert is sent to IT support staff.

Consider the Following Example Sequence of Log File Entries

```
2010-08-18 02:00:00:437 INFO Preventative Maintenance started.
Version: 5.78 den 1 april 2010. Update on: den 1 oktober 2011
2010-08-18 02:00:01:218 INFO Beginning backup of all, with 2 threads
2010-08-18 02:00:01:453 WARNING Could not disconnect client:
Proxy[ooOO,RemoteObjectInvocationHandler[UnicastRef [liveRef:
[endpoint:[10.100.99.14:4269](remote),objID:[-7fa760b7:12a80222289:-
7ffe,-4425482139264106608]]]]]
2010-08-18 02:00:01:906 INFO RDRServerImpl. Used memory: 66
```

To pre-process these log file entries before interpretation by the knowledge base, we construct a TCA. The Keywords in the TCA are:
  (a) "PM" referring to "Preventative Maintenance" and other similar phrases;
  (b) "WARN" referring to "WARNING" and other similar phrases; and
  (c) "DC" referring to "Could not disconnect client" and other similar phrases.

The value of the TCA for these log file entries is the normalised text form "PM WARN DC". One of the Key Concepts of the TCA is the Derived Attribute "Alert". It is defined as having the Boolean value "true" if the normalised text form contains "WARN" which in this example it does.

The knowledge base has a rule to add a workflow action "Send alert email" if the value of the Attribute Alert is "true". This workflow action includes the email addresses of the IT support staff to be notified, the email header provides a summary of the alert, and the email body describes the details of the alert.

Another of the Key Concepts of the TCA is the Derived Attribute "FalsePositive". It is defined as having the Boolean value "true" if the normalised text form contains "PM WARN DC" which in this example it does.

The knowledge base has another subsequent rule to remove the workflow action "Send alert email" if the value of the Attribute FalsePositive is "true".

At the pre-processing stage, the two Derived Attributes Alert and FalsePositive are added to the case, and both have value "true".

During the knowledge base inferencing stage, the alerting workflow action is added to the interpretation by the rule with condition "Alert is true". However, the alerting workflow action is removed by the subsequent rule with condition "FalsePositive is true", with the final outcome that there is no alerting workflow action in the interpretation, and hence no alert email is sent to IT support staff.

Now that embodiments have been described, it will be appreciated that some embodiments may have some of the following advantages:
  It is possible to process a large number of data items (including in some embodiments, text results presented as freeform text) for the purpose of generating a single text report.
  The report presents the significant data items for each case in an appropriate order, with a linguistically natural syntax.
  The number of specific report variations are essentially infinite due to the number of possible subsets of data items, and the number of possible orderings within each subset.
  The number of specific rule conditions that determine a particular report are also essentially infinite due to the number of patterns in the Attributes in the case, and in their values.
  The expert is nevertheless able to build and maintain the knowledge base with a manageable number of rules, as the rules are based on Derived Attributes which are the output of a pre-processing stage.
  An expert system is provided that can manage large numbers of Attributes and the correspondingly large number of report variations.

It will be appreciated that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of generating information from a plurality of data items, the method comprising the steps of:
  (a) populating an aggregate data item with at least one of the plurality of data items;
    wherein each individual data item comprises original information including an attribute and a value,
    wherein the attribute of the individual data item is an identifier for the individual data item,
    wherein the aggregate data item is a form of derived attribute,
    wherein the derived attribute represents a transformation of a collection of individual data items into a single data item with a value,
    wherein said value of the derived attribute is an aggregate value comprising a map of attribute to value for each said individual data item within said collection of individual data items such that a derived attribute forms a single data item suitable for inferencing by a knowledge base, said single data item retaining the original information relating to each of the plurality of individual data items yet queried by the knowledge base as a whole to extract information regarding said individual data items; and
  (b) generating the information using the aggregate data item,
  wherein the method of generating information is performed by a decision support system, and
  wherein the information so generated falls into one or more of the following groups:
    i. textual information;
    ii. a machine instruction.

2. The method defined by claim 1 including a prestep of preprocessing the plurality of data items to extract one or more derived attributes from the plurality of data items thereby reducing data complexity.

3. The method defined by claim 2 wherein the preprocessing of data occurs in iterations such that one or more derived attributes are extracted from derived attributes constructed in earlier iterations.

4. The method defined by claim 1 wherein the formula is based on one or more of the following considerations:
   (a) identifiers of the plurality of data items;
   (b) identifiers of one or more derived attributes;
   (c) values of the plurality of data items;
   (d) values of the one or more derived attributes;
   (e) values of multiple instances of a data item, wherein the multiple instances of said data items are presented in:
      i. a time-based sequence;
      ii. any other vector format;
   (f) values of multiple instances of the derived attribute, wherein the multiple instances of said derived attributes are presented in:
      i. a time-based sequence;
      ii. any other vector format.

5. The method defined by claim 1 wherein the derived attribute is one or more of the following:
   (a) an aggregate data item;
   (b) a text condenser attribute;
   (c) any other result of preprocessing data that extracts one or more high level concept data items from a plurality of data items thereby reducing data complexity.

6. The method defined by claim 5 wherein the plurality of data items in step (c) is a plurality of derived attributes.

7. A method defined by claim 5 wherein the text condenser attribute maps one or more sequences of key terms to a key concept, and wherein a key term is a regular expression referring to a fragment of freeform text such that information can be extracted from freeform text.

8. A method defined by claim 7, wherein each key concept comprises:
   (a) a target, wherein the target is a derived attribute in the decision support system;
   (b) an extraction formula, wherein the extraction formula defines one or more values of the target in terms of a fragment of freeform text selected by a matching form; and
   (c) a list of matching forms, wherein each matching form is a sequence of key terms.

9. A method defined by claim 1 comprising the prestep of identifying one or more sets of data items, wherein membership of said sets (set membership) is determined by one or more of:
   (a) a data item identifier;
   (b) a data item value
   (c) a data item type;
   (d) other characteristic of a data item;
   wherein set membership enables mapping of individual data items to an aggregate data item.

10. A method defined by claim 9 wherein the sets of data items include sets of derived attributes.

11. A method defined by claim 9 comprising populating the aggregate data item with at least one of the plurality of data items in accordance with set membership.

12. A method defined by claim 11 wherein the step of populating the aggregate data item comprises the step of populating the aggregate data item by applying a rule to one or more of the following:
   (a) at least one of the plurality of data items;
   (b) one or more derived attributes, including another aggregate data item.

13. A method defined by claim 9 wherein the step of generating the information comprises the step of including in the information one or more of the following:
   (a) identifers of the data items;
   (b) identifers of the derived attributes;
   (c) values of the data items;
   (d) values of the derived attributes.

14. A method defined by claim 13 wherein the step of generating information comprises the step of determining the order of the identifiers and values in the information.

15. A method defined by claim 1, the method further comprising the step of constructing a conceptual representation of information,
   wherein the conceptual representation is a conclusion given by the evaluation of rules of the decision support system based on an analysis of one or more of the following:
      (a) the plurality of data items;
      (b) one or more derived attributes;
      (c) one or more conclusions evaluated in an earlier iteration of one or more rules,
   wherein construction of conclusions occurs in successive re-evaluation of the rules.

16. A method defined by claim 15, the method further comprising the step of constructing conclusions, wherein constructing conclusions occurs in iterations of rule evaluations, wherein each successive rule evaluation makes use of conclusions constructed in earlier rule evaluations.

17. A method defined by claim 15 wherein the conceptual representation includes an interpretive portion,
   wherein the interpretive portion represents an operation on one or more aggregate data items, and wherein the operation on the one or more aggregate data items includes determining one or more of the following:
      (a) the number of data items comprising the one or more aggregate data items;
      (b) if the one or more aggregate data items is empty;
      (c) if the one or more aggregate data items includes a specific data item;
      (d) any other set operation.

18. A method defined by claim 17, wherein the step of generating information includes generating information from the interpretive portion.

19. A method defined by claim 1 wherein the step of generating the information comprises an iterative process applying one or more rules to one or more of the following:
   (a) one or more derived attributes;
   (b) one or more conclusions.

20. A method defined by claim 19 wherein the one or more rules may form at least part of a ripple down rules knowledge system.

21. A method defined by claim 1 comprising the steps of:
   (a) iteratively evaluating a hierarchy of derived attributes;
   (b) repeatedly inferencing using ripple down rules to arrive at one or more final conclusions;
   (c) using one or more final conclusions in generating the information.

22. A method defined by claim 1 wherein the textual information is any human readable information.

23. A method defined by claim 1 wherein the textual information is syntactically and/or grammatically correct.

24. A method defined by claim 23 wherein the textual information is expressed in a language determined by one or more rules.

25. A method defined by claim 24 including the substep of translating one or more of the following:
 (a) one or more data item identifiers;
 (b) one or more data item values;
 (c) one or more derived attribute identifiers;
 (d) one or more derived attribute values;
 (e) one or more conclusions,
 into the language determined by the one or more rules.

26. A method defined by claim 1, wherein the textual information forms at least part of a report.

27. A method defined by claim 1, wherein the machine instruction is expressed in an instruction format determined by one or more rules.

28. A system for generating information from a plurality of data items, the system comprising:
 a computing device;
 (a) a preprocessor executable in the computing device, the preprocessor being configured for:
  i. populating an aggregate data item with at least one of the plurality of data items;
 wherein each individual data item comprises original information including an attribute and a value,
 wherein the attribute of the individual data item is an identifier for the individual data item,
 wherein the aggregate data item is a form of derived attribute,
 wherein the derived attribute represents a transformation of a collection of individual data items into a single data item with a value,
  wherein said value of the derived attribute is an aggregate value comprising a map of attribute to value for each said individual data item within said collection of individual data items such that a derived attribute forms a single data item suitable for inferencing by a knowledge base, said single data item retaining the original information relating to each of the plurality of individual data items yet queried by the knowledge base as a whole to extract information regarding said individual data items; and
  ii. for constructing one or more other derived attributes from the plurality of data items; and
 (b) an information generator executable in the computing device, the information generator configured for generating the information using the derived attributes,
 wherein the information generator forms at least part of a decision support system, and
 wherein the information so generated falls into one or more of the following groups:
  i. textual information;
  ii. a machine instruction.

29. A system defined by claim 28 wherein the preprocessor is able to iteratively construct derived attributes which use derived defined earlier in the iterative process.

30. A system defined by claim 28 wherein the information generator is able to iteratively construct conclusions using rules which use conclusions defined earlier in the iterative process.

31. A system defined by claim 28 wherein the derived attribute is one or more of the following:
 (a) an aggregate data item;
 (b) a text condenser attribute;
 (c) any other result of preprocessing data that extracts one or more high level concept data items from a plurality of data items thereby reducing data complexity.

32. A system defined by claim 28, the system further comprising a receiver for receiving a plurality data items.

33. A system defined by claim 28, the system further comprising a builder for defining one or more of the following:
 (a) an aggregate data item;
 (b) one or more rules;
 (c) other derived attributes;
 (d) one or more conclusions;
 (e) any other result of preprocessing data that extracts one or more high level concept data items from a plurality of data items thereby reducing data complexity;
 (f) any other conceptual representation used in defining an interpretive portion.

34. A system defined by claim 28, the system further comprising a sender wherein the sender sends the generated information to one or more of:
 (a) a machine;
 (b) a recipient.

35. A method defined by claim 1 including using a computer program comprising instructions for controlling a computer to implement a method in accordance with the method defined by claim 1.

36. A method defined by claim 35 including a computer readable medium providing a computer program in accordance with the computer program of claim 35.

37. A method defined by claim 1 further comprising:
 applying a rule to said aggregate data item,
  wherein said rule is applied by a rules-based knowledge base,
  wherein said rule includes a set operation that includes at least one of the following operations performed on said collection of individual data items:
 querying;
 iterate over;
 identifying subsets;
 identifying a specific individual data item;
 sorting; and
 comparing the collection of individual data items with other collections of individual data items;
  wherein said rule is able to query said plurality of individual data items as a single data item rather than relying on a plurality of rules for each individual data item or a combination thereof.

38. A method defined by claim 1 wherein the step of generating the information comprises at least one of the following:
 including in the information the identifier of at least one individual data item populating the aggregate data item; and
 including in the information the value associated with at least one individual data item populating the aggregate data item;
 wherein said rules-based knowledge base is able to generate information regarding a plurality of individual data items by applying a rule including a set operation to a derived attribute.

* * * * *